United States Patent
Okumura et al.

(10) Patent No.: US 11,009,742 B2
(45) Date of Patent: May 18, 2021

(54) MULTI-DISPLAY

(71) Applicant: Mitsubishi Electric Corporation, Chiyoda-ku (JP)

(72) Inventors: Takanori Okumura, Tokyo (JP); Naoko Iwasaki, Tokyo (JP); Toshiaki Fujino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 33 days.

(21) Appl. No.: 16/337,475

(22) PCT Filed: Jul. 24, 2017

(86) PCT No.: PCT/JP2017/026676
§ 371 (c)(1),
(2) Date: Mar. 28, 2019

(87) PCT Pub. No.: WO2018/116514
PCT Pub. Date: Jun. 28, 2018

(65) Prior Publication Data
US 2019/0302522 A1 Oct. 3, 2019

(30) Foreign Application Priority Data
Dec. 19, 2016 (JP) .............................. JP2016-245026

(51) Int. Cl.
G02F 1/1335 (2006.01)
G02F 1/1333 (2006.01)
(Continued)

(52) U.S. Cl.
CPC ...... G02F 1/133526 (2013.01); G02F 1/1333 (2013.01); G02F 1/1335 (2013.01);
(Continued)

(58) Field of Classification Search
CPC .. G02F 1/1333; G02F 1/1335; G02F 1/13326; G02F 1/13336; G02F 1/13308;
(Continued)

(56) References Cited

U.S. PATENT DOCUMENTS

2011/0317272 A1 12/2011 Horikawa
2012/0147314 A1 6/2012 Yoshizawa et al.
(Continued)

FOREIGN PATENT DOCUMENTS

CN 104751808 A 7/2015
JP 60-242424 A 12/1985
(Continued)

OTHER PUBLICATIONS

International Search Report dated Oct. 17, 2017 in PCT/JP2017/026676 filed Jul. 24, 2017.
(Continued)

*Primary Examiner* — Jie Lei
(74) *Attorney, Agent, or Firm* — Xsensus LLP

(57) ABSTRACT

A multi-display includes a display panel array with the display panels arranged, and a protective plate disposed over a surface of the display panel array where light is emitted, so as to cover the display panel array. The protective plate has an optical refractive device of groove shape disposed in a position corresponding to a joint between the adjacent display panels of the display panel array, so as to extend along the joint. The optical refractive device refracts the light from the display panels. Each display panel has a display surface having sub-pixels constituting individual pixels. The sub-pixels are arranged in such a manner that the sub-pixels of two or more different display colors are disposed between the sub-pixels of the same display color. The sub-pixels of the display panels adjacent to each other via the joint are arranged in such a manner that color
(Continued)

arrangements are different from each other at panel ends facing each other via the joint.

6 Claims, 19 Drawing Sheets

(51) Int. Cl.
    *G09F 9/40*         (2006.01)
    *G09F 9/00*         (2006.01)
    *G09F 9/30*         (2006.01)
    *G09F 9/302*       (2006.01)

(52) U.S. Cl.
    CPC .... *G02F 1/13336* (2013.01); *G02F 1/133308* (2013.01); *G09F 9/00* (2013.01); *G09F 9/30* (2013.01); *G09F 9/302* (2013.01); *G09F 9/40* (2013.01); *G02F 1/133331* (2021.01); *G02F 2201/52* (2013.01)

(58) Field of Classification Search
    CPC ... G02F 1/133502; G02F 2001/133331; G02F 2201/52; G02F 1/133526; G02F 1/133308; G02F 1/133331; G02F 9/00; G02F 9/30; G02F 9/302; G02F 9/40; G09G 3/36; G09G 3/3607; G09G 3/3614; G09G 3/3648; G02B 27/22; G02B 27/2214; G09F 9/00; G09F 9/30; G09F 9/302; G09F 9/40

USPC ...... 359/741, 474, 475, 477; 349/58, 73, 83, 349/149

See application file for complete search history.

(56) References Cited

U.S. PATENT DOCUMENTS

| | | |
|---|---|---|
| 2013/0301263 A1 | 11/2013 | Yamanaka |
| 2014/0168549 A1 | 6/2014 | Murao et al. |
| 2015/0187293 A1 | 7/2015 | Yoo et al. |
| 2016/0260401 A1 | 9/2016 | Sakaigawa |

FOREIGN PATENT DOCUMENTS

| | | |
|---|---|---|
| JP | 5-188873 A | 7/1993 |
| JP | 9-61809 A | 3/1997 |
| JP | 2011-191595 A | 9/2011 |
| JP | 2013-72980 A | 4/2013 |
| JP | 2015-129907 A | 7/2015 |
| JP | 2016-161920 A | 9/2016 |
| WO | WO 2011/024705 A1 | 3/2011 |
| WO | WO 2012/102349 A1 | 8/2012 |
| WO | WO 2013/031592 A1 | 3/2013 |

OTHER PUBLICATIONS

Office Action dated Oct. 12, 2020, in corresponding Chinese patent Application No. 2017800711293, 17 pages.

FIG. 6
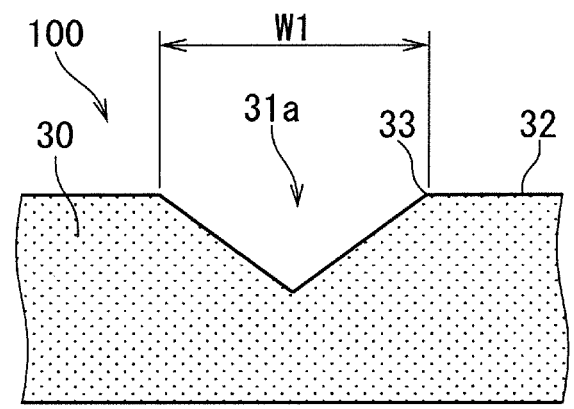
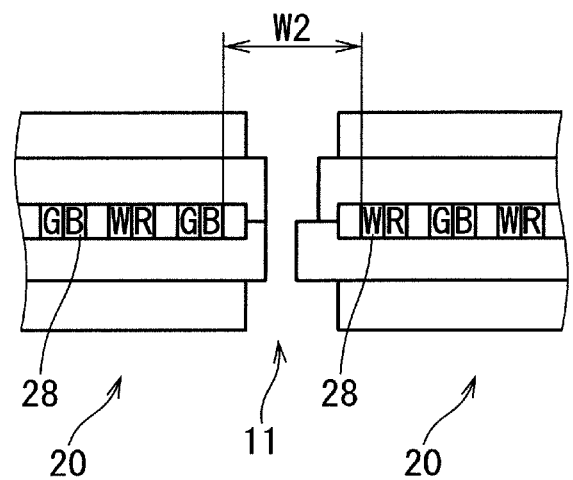

FIG. 8
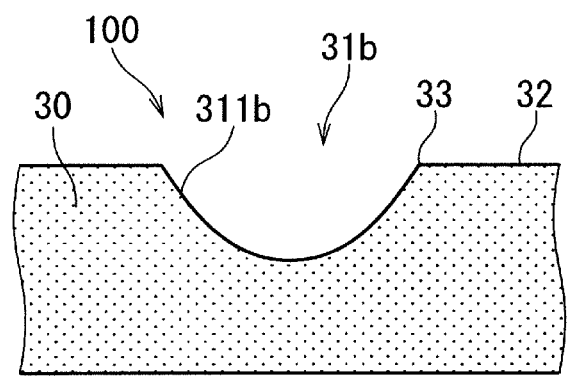
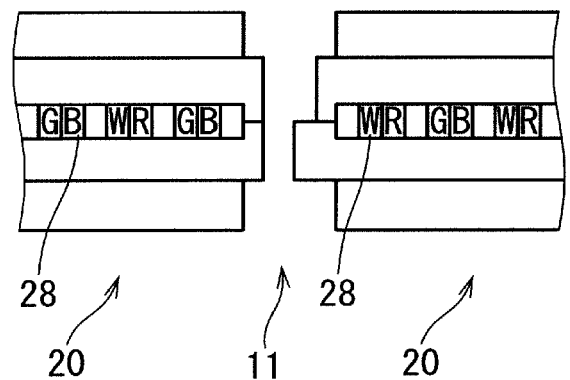

FIG. 10
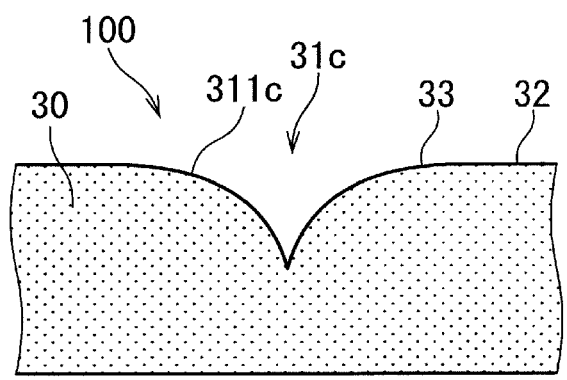
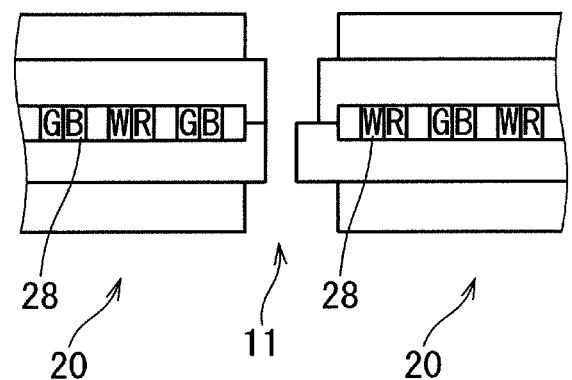
FIG. 11
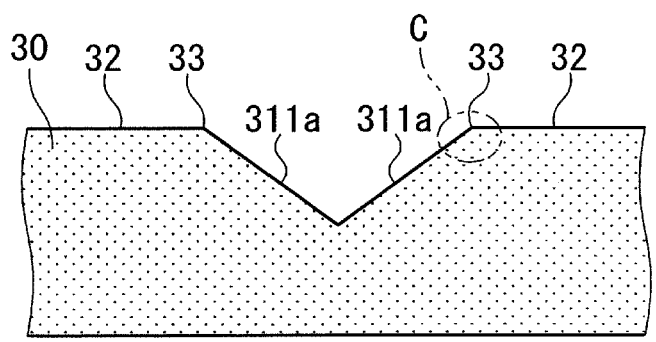

F I G. 1 2
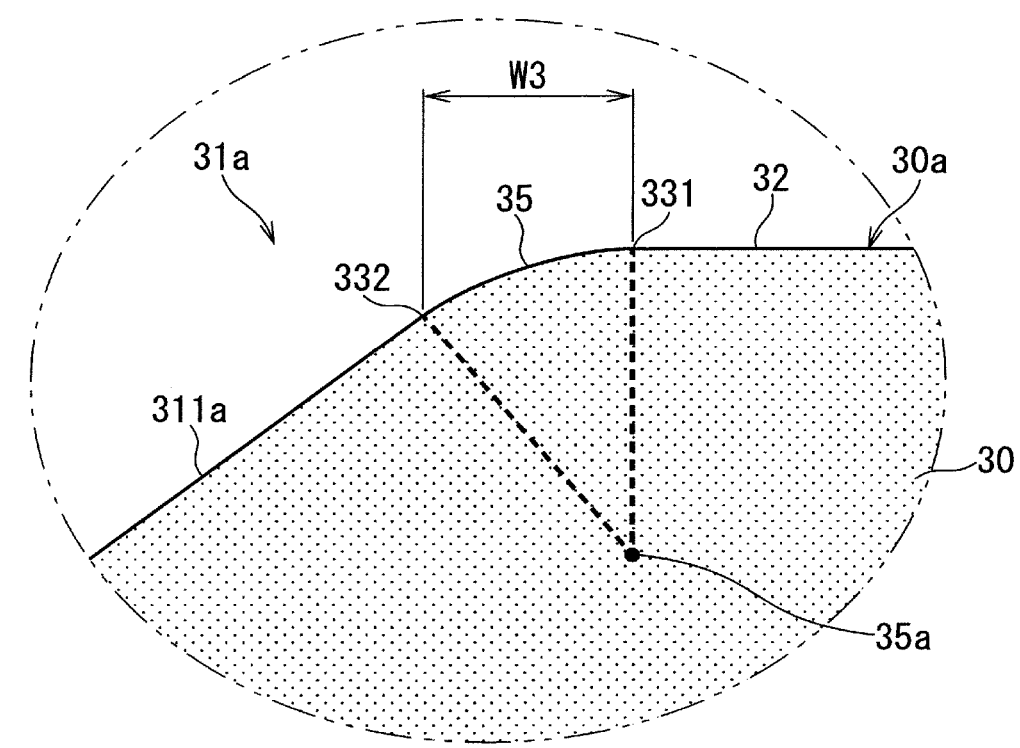

MULTI-DISPLAY

TECHNICAL FIELD

The present invention relates to multi-displays each having a plurality of display panels, and particularly, to a multi-display of improved display quality.

BACKGROUND ART

Liquid crystal displays, organic electroluminescence displays, plasma displays, all of which are lightweight, thin and less-power-consuming displays, are used in, for instance, portable information machines such as personal computers.

A multi-display, which includes a plurality of such displays arranged to thus form a large display screen, is widely used in a digital signage that requires a large display screen, a control and monitor display, and other kinds of display.

In particular, the liquid crystal displays are most widely used and are often used in such multi-displays. Improvements in the screen durability and screen visibility of the liquid crystal displays have been made in order to display images and pictures of higher quality.

The liquid crystal display includes a liquid-crystal display panel, a backlight unit, an electronic circuit that supplies various electrical signals to the liquid-crystal display panel, a power supply, and a casing enclosing these components. The liquid-crystal display panel is composed of liquid crystals held between a pair of substrates (i.e., an array substrate having pixel electrodes and a color filter substrate having a common electrode) that are bonded together.

The liquid-crystal display panel of the liquid crystal display has two areas: one is an active area in which a plurality of pixels are arranged, and in which images and pictures are displayed; and the other is an inactive area that is a frame area outside the active area. The active area is provided with thin-film transistors, which are switching devices, and the pixel electrodes, and other things. A voltage freely controlled by the thin-film transistors is applied between the pixel electrode and the common electrode, so that liquid-crystal molecules change their alignment, to thus control light transmittance when light from a backlight passes through the liquid crystals. In this way, the liquid crystal display displays images and pictures.

Meanwhile, the inactive area, that is, the frame region, is provided with components essential for the liquid-crystal display panel, such as a sealant sealing the liquid crystals between the substrates, wires connected to the thin-film transistors and other things, and a terminal connected to an external drive circuit. Thus, the inactive area cannot be eliminated. The inactive area is part of a non-display region, where images or other things are not displayed. A viewer sees such inactive areas as joints in the multi-display, which includes a plurality of display panels arranged to form a large screen. The non-display region, which cuts off image continuity and picture continuity, is one factor in display quality degradation in the multi-display.

Patent Document 1 discloses a multi-display system that includes a translucent cover provided with a recess over the joint between the adjacent liquid-crystal display panels, and with a flat portion over an active area.

Patent Document 2 discloses an array-type display that includes a transparent plate having a slope portion formed in such a manner that the thickness of the outer peripheral end of a panel is thinner than a flat portion.

The recess of the translucent cover in Patent Document 1 and the slope portion of the transparent plate in Patent Document 2 serve as an optical lens that refracts light beams emitted from the display panels to thus enlarge the images and the pictures. This optical lens makes the viewer see the image as if it is displayed in part of the frame region as well, so that the joint is inconspicuous.

In addition, provided are scattering structures on the front surfaces of the translucent cover and the transparent plate, that is, on their entire surfaces from which the view sees the images. This scattering structure scatters the light beams from the display panel, thus improving viewing angle properties or controlling the light beams to have a desired optical property, and also reducing unwanted reflection of external light beams.

PRIOR ART DOCUMENTS

Patent Documents

Patent Document 1: Re-publication of PCT International Publication No. 2012/102349

Patent Document 2: Japanese Patent Application Laid-Open No. 2013-72980

SUMMARY

Problem to be Solved by the Invention

The inventors have studied the disclosures of Patent Documents 1 and 2 to find that if the multi-display includes the translucent cover or the transparent plate, the viewer sees, in mixed-color display, a monochrome bright line at the boundary between the flat portion and recess of the translucent cover or at the boundary between the flat portion and slope portion of the transparent plate.

Furthermore, the scattering structure, if disposed on the entire surface of the translucent cover or transparent plate, has a too strong degree of scattering, thus lowering image definition and extremely degrading display quality.

To solve these problems, it is an object of the present invention to provide a multi-display having a plurality of display panels arranged, the multi-display preventing the degradation in display quality at joints.

Means to Solve the Problem

A multi-display according to the present invention includes a display panel array in which a plurality of display panels are arranged, and a protective plate disposed over a surface of the display panel array from which light is emitted, so as to cover the display panel array. The protective plate has a front surface provided with an optical refractive device of groove shape. The optical refractive device is disposed in a position corresponding to a joint between the adjacent display panels of the display panel array, so as to extend along the joint. The optical refractive device refracts the light from the display panels. Each display panel has a display surface provided with a plurality of sub-pixels constituting individual pixels. The sub-pixels are arranged in such a manner that the sub-pixels of two or more different display colors are disposed between the sub-pixels of the same display color, in at least a direction that extends along the joint and is parallel to a direction where the joint extends. The sub-pixels of the display panels adjacent to each other via the joint are arranged in such a manner that color arrangements are different from each other at panel ends facing each other via the joint.

Effects of the Invention

The multi-display according to the present invention prevents, in mixed-color display, a monochrome bright line found at a boundary where a flat portion of the protective plate and the optical refractive device are connected to each other, thereby preventing display quality degradation at the joint.

BRIEF DESCRIPTION OF DRAWINGS

FIG. 6 is a cross-sectional view of the configuration around the joint of the multi-display according to the first embodiment.

FIG. 8 is a cross-sectional view of the configuration around the joint in the other configuration of the multi-display according to the first embodiment.

FIG. 10 is a cross-sectional view of the configuration around a joint in the still other configuration of the multi-display according to the first embodiment.

FIG. 11 is a partial cross-sectional view of an optical refractive device at the joint of the multi-display according to the first embodiment.

FIG. 12 is an enlarged view of a region including a boundary of the optical refractive device.

DESCRIPTION OF EMBODIMENT(S)

Embodiments of a multi-display according to the present invention will be described. Identical components are denoted by identical signs, and have identical names. Moreover, these identical components have functions substantially identical to each other. Thus, these identical components are not elaborated upon in some cases. the dimension, material, and shape of each component that are illustrated in the embodiments, and the relative relationship in arrangement between the components, can change as necessary, depending on the configuration of an apparatus in which the present invention is used and on various conditions. The present invention is not limited to these illustrations. Moreover, the dimension of each component in each drawing is different from its actual size in some cases. Furthermore, although each embodiment describes, as one example, a liquid crystal display having a display panel composed of liquid crystals, other types of display, such as an organic electroluminescence display and a plasma display, can be also used.

<Preface>

Figure 18:
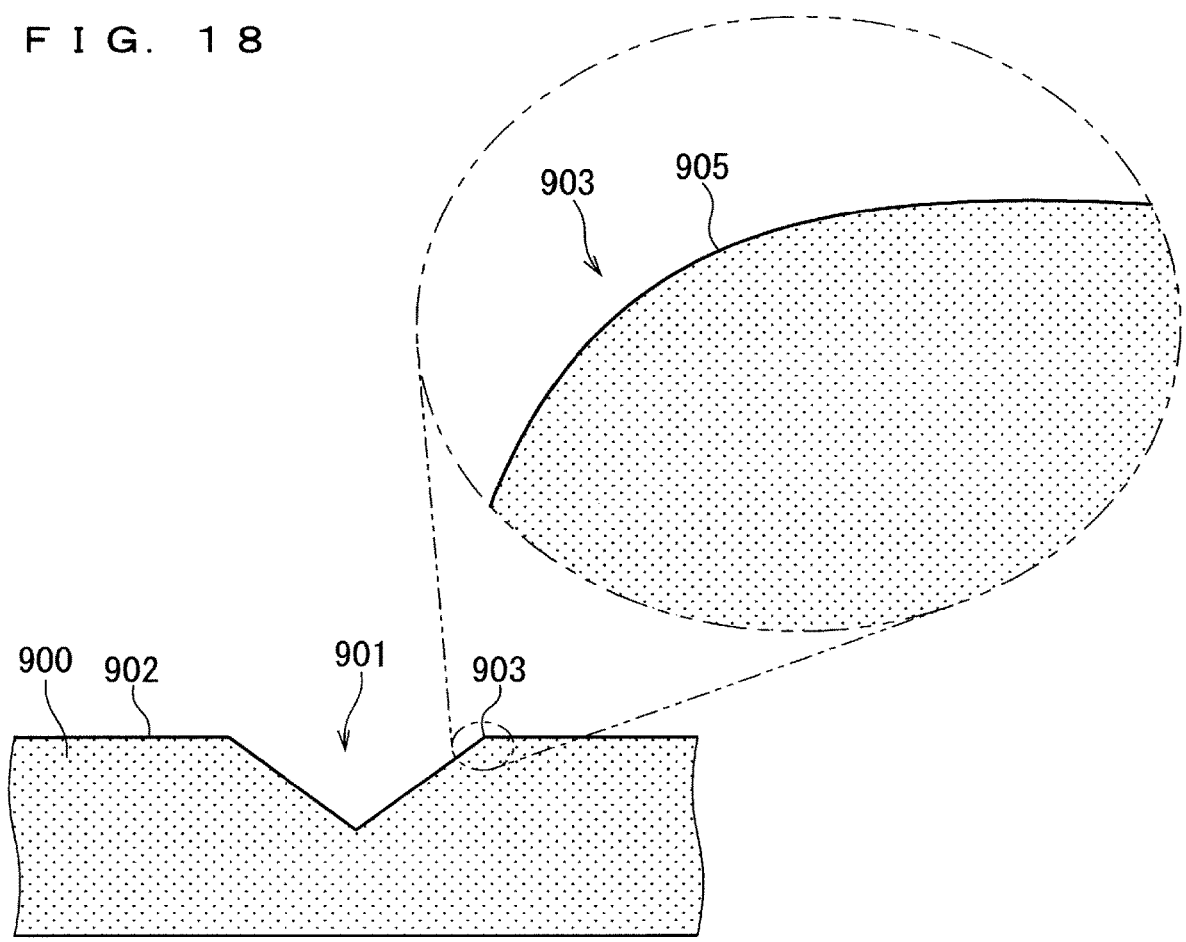
FIG. 18 is a cross-sectional view of the configuration of a front-surface protective plate. This cross-sectional view is used to describe the cause of a monochrome bright line found in a multi-display.

Firstly, the following describes the cause of a monochrome bright line found in a multi-display. Thereafter, the embodiments of a multi-display in the present invention will be described. FIG. 18 is a partial cross-sectional view of a front-surface protective plate 900 included in a typical multi-display.

As illustrated in FIG. 18, the front-surface protective plate 900 includes an optical refractive device 901 serving as an optical lens, and flat portions 902. The front-surface protective plate 900 has an arc-shaped curve 905 at a boundary 903 between the optical refractive device 901 and each flat portion 902. The curve 905 is formed when the front-surface protective plate 900 is processed through one of cutting, grinding, extrusion molding, and compression molding. The arc has such a shape as to protrude toward a viewer. The boundary between the optical refractive device 901 and the flat portion 902 consists of a combination of planes, that is, a combination of straight lines in cross-sectional view, if the front-surface protective plate 900 is produced as designed. In other words, let the front-surface protective plate be produced ideally. Then, its boundary is not an arc in cross-sectional view; there is a vertex at the connection point between the optical refractive device 901 and the flat portion 902, and the vertex forms the boundary 903. However, if the front-surface protective plate 900 is processed through any of cutting, grinding, extrusion molding, and compression molding, the limitations of processing accuracy and variations in processing accuracy create the microscopic arc-shaped curve 905 at the boundary 903. This problem is hard to overcome completely.

Figure 19:
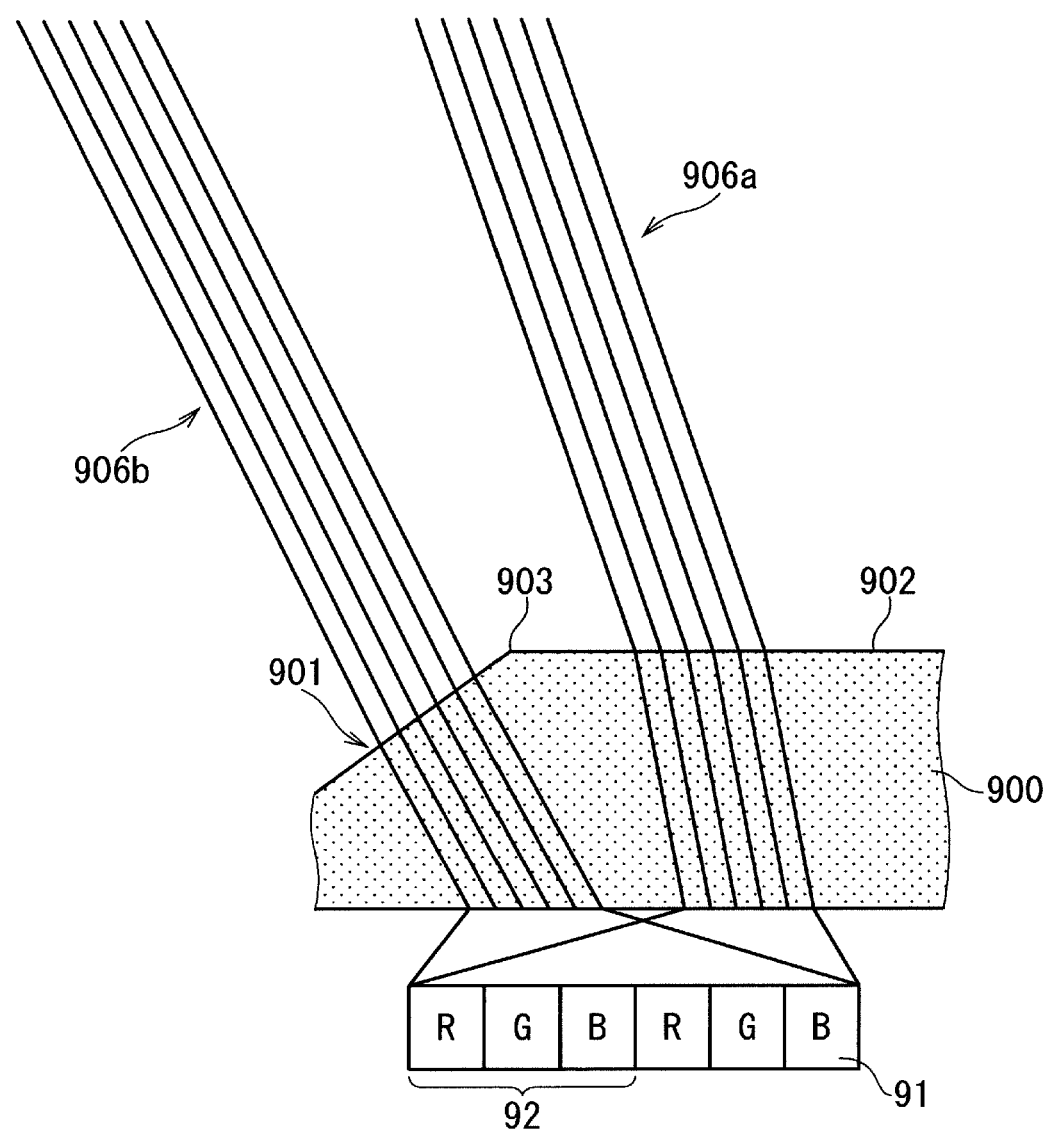
FIG. 19 is a diagram illustrating the direction of light beams emitted from the front-surface protective plate. This diagram is used to describe the cause of the monochrome bright line found in the multi-display.
Figure 20:
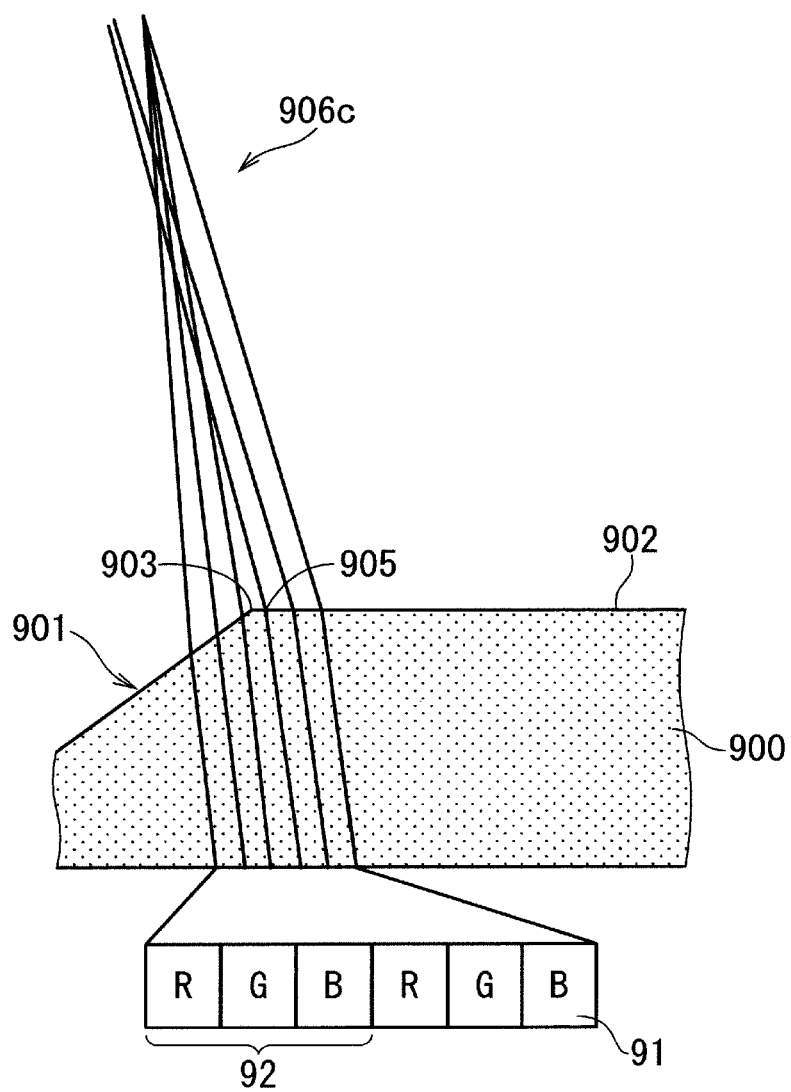
FIG. 20 is a diagram illustrating the direction of the light beams emitted from the front-surface protective plate. The diagram is used to describe the cause of the monochrome bright line found in the multi-display.

FIGS. 19 and 20 each schematically illustrate light beams near the boundary 903 of the front-surface protective plate 900, the light beams being emitted from individual pixels 92 in a liquid-crystal display panel, passing through the inside of the front-surface protective plate 900, and then going outside from the plate's surface.

Although FIGS. 19 and 20 schematically illustrate the arrangement of a red (R) sub-pixel 91, a green (G) sub-pixel 91, and a blue (B) sub-pixel 91 that constitute the pixel 92, this arrangement of the sub-pixels 91 is one example applied to a typical liquid-crystal display panel. In the examples in FIGS. 19 and 20, the sub-pixels 91 of the same color are arranged in a direction where the boundary 903 of the front-surface protective plate 900 extends, and the sub-pixels 91 are arranged in the order of R, G, and B in a direction orthogonal to the direction where the boundary 903 extends.

It is noted that FIGS. 19 and 20 do not exactly depict the position and size of the sub-pixels 91 with respect to the front-surface protective plate 900. For instance, FIGS. 19 and 20 schematically illustrate that six light beams constituting a light bundle are emitted from the respective six sub-pixels 91.

Reference is made to the front-surface protective plate 900 in FIG. 19. The optical refractive device 901 and the flat portion 902 are produced as designed; thus their boundary 903 consists of a vertex. As illustrated in FIG. 19, the light beams are emitted from the plane of the optical refractive device 901 and the flat portion 902 when the boundary 903 consists of a vertex.

Reference is now made to the front-surface protective plate 900 in FIG. 20. The curve 905 is formed at the boundary 903, where the optical refractive device 901 and the flat portion 902 are connected together. FIG. 20 depicts the light beams going out from the curve 905.

Referring to FIG. 19, the drawing shows a light bundle 906a consisting of light beams parallel to each other that have passed through the individual sub-pixels 91. In white display where the light beams are emitted from the sub-pixels 91 of all three colors: red (R), green (G), and blue (B), the light beams of the light bundle 906a are approximately parallel to each other after going out from the flat portion 902. The distance between the light beams of these colors is so small that the colors are uniformly mixed. Accordingly, the viewer sees the light bundle 906a as white. The drawing also shows a light bundle 906b consisting of light beams emitted from the plane (slope), which forms the optical refractive device 901. The individual light beams of red (R), green (G), and blue (B) adjacent to each other are approximately parallel to each other; thus these colors are uniformly mixed. Accordingly, the viewer sees the light bundle 906b as white.

Referring to FIG. 20, the drawing shows a light bundle 906c emitted from the curve 905 of the boundary 903. Here, the individual light beams of red (R), green (G), and blue (B) adjacent to each other enter the front-surface protective plate 900 and are refracted, at angles that are mutually different little by little with respect to the arc of the curve 905, and are then emitted from the curve 905 at angles that are mutually different little by little. Accordingly, the light bundle 906c, emitted from the front-surface protective plate 900, has spatially dense and sparse light beams. Consequently, the colors of such light beams are not uniformly mixed. As a result, the viewer only sees enhanced red, for instance. Alternatively, the viewer sees enhanced yellow consisting of red (R) and green (G) mixed together, depending on viewing positions.

Figure 21:
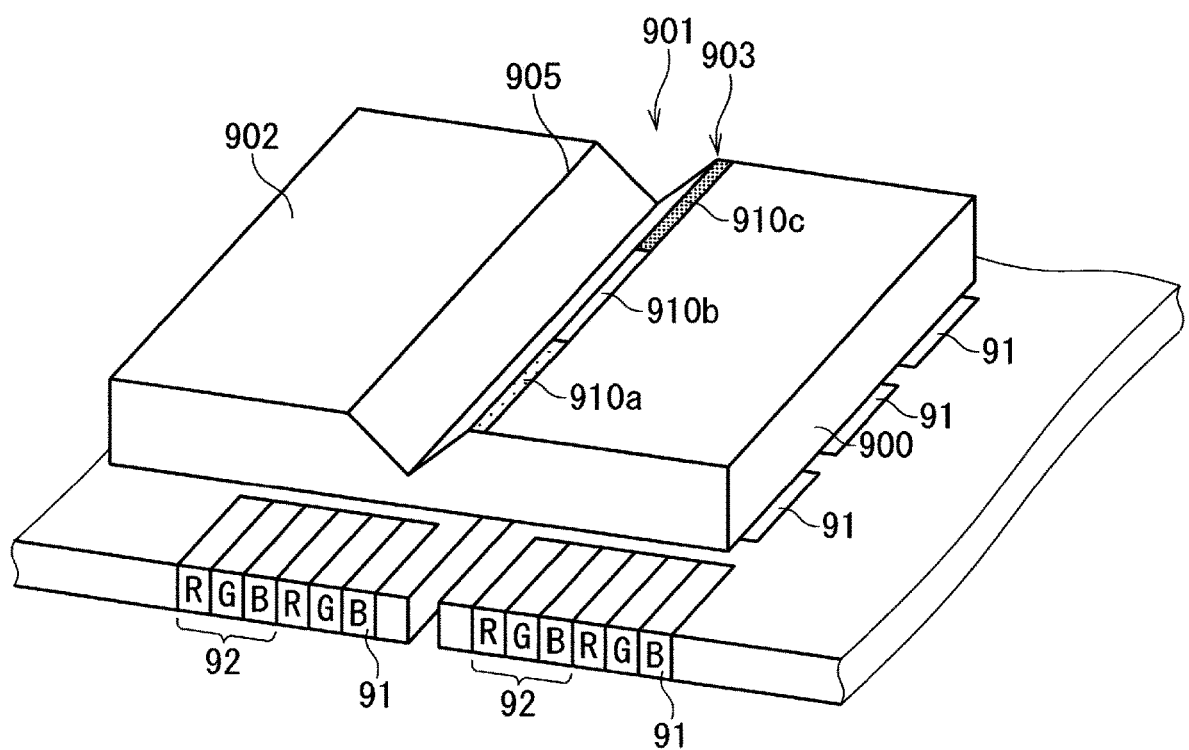
FIG. 21 is a perspective view of the monochrome bright line found in the multi-display.

The boundary 903 is located along the joint between the adjacent liquid-crystal display panels, and has a cross-sectional shape extending along the joint while keeping a similar shape. Accordingly, the viewer sees a red bright line along the boundary 903 when, for instance, light beams that enhance red are being emitted. How a bright line is viewed by the viewer varies depending on slight changes in the cross-sectional shape of the boundary 903 and on minor movements of the viewer's eyeballs. FIG. 21 is a perspective view of a portion of the front-surface protective plate 900 provided with the optical refractive device 901. In some cases, the light beams emitted from the individual pixels 92 located in the liquid-crystal display panel, form a bright line that is viewed as changing its color depending on locations (e.g., the bright line changes, along the boundary 903, from a red bright line 910a to a green bright line 910b, and from the green bright line 910b to a blue bright line 910c).

The above multi-display, which has the curve 905 at the boundary 903 of the front-surface protective plate 900, can involve a monochrome bright line found at the boundary 903 in mixed-color display (e.g., in white display or yellow display), thus greatly degrading display quality.

First Embodiment

<Overall Configuration of Multi-Display>

Figure 1:
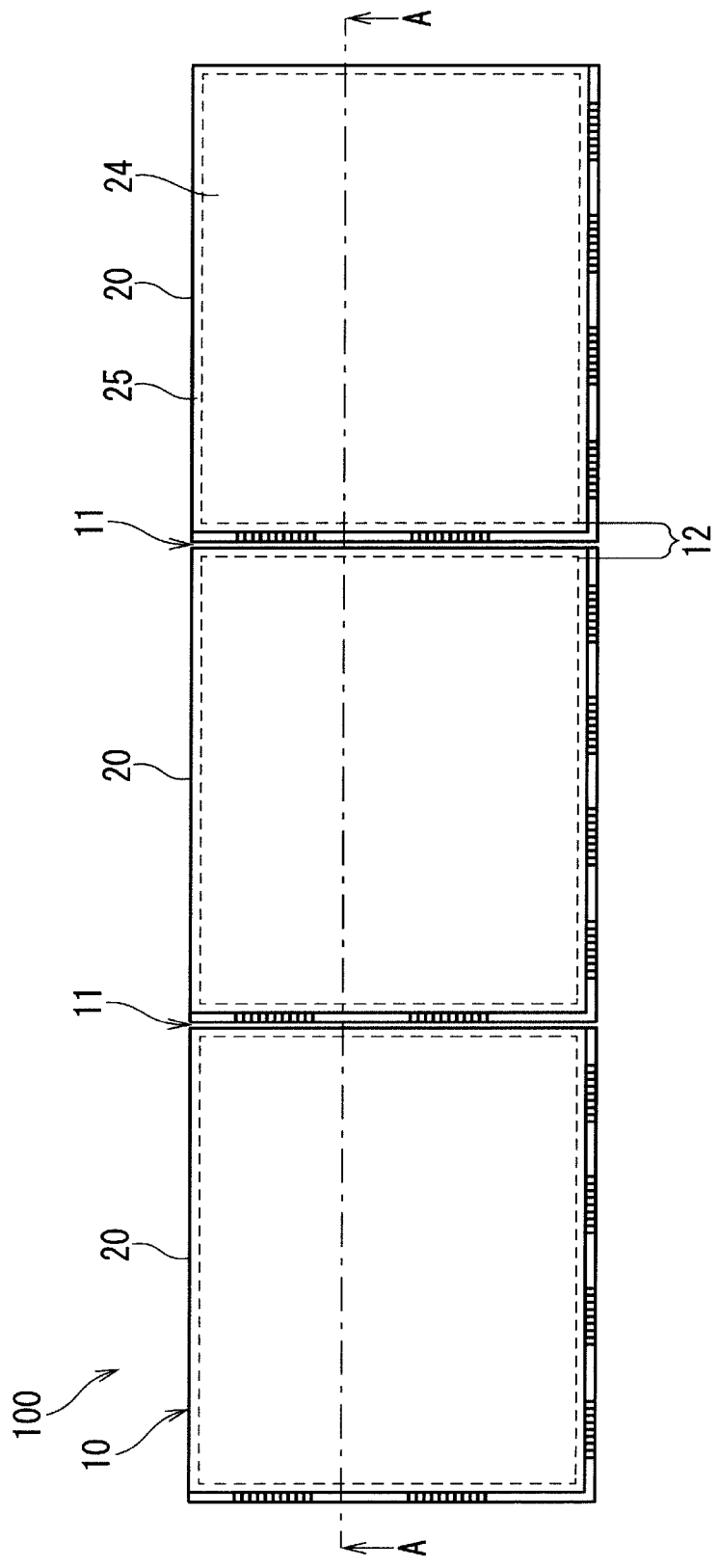
FIG. 1 is a plan view of one configuration of a multi-display according to a first embodiment.
Figure 2:
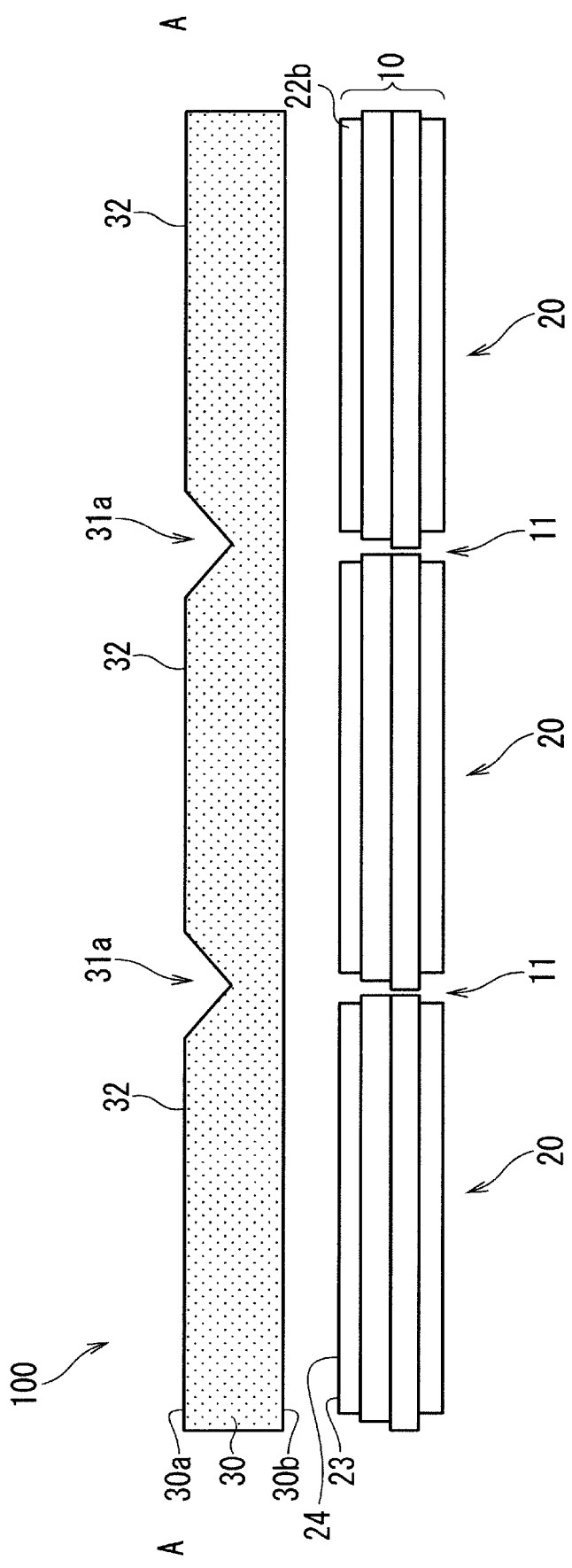
FIG. 2 is a cross-sectional view of the configuration of the multi-display according to the first embodiment.

FIG. 1 is a plan view of the appearance of a multi-display 100 according to a first embodiment. FIG. 2 is a cross-sectional view of the multi-display 100 taken along line A-A in FIG. 1. As illustrated in FIG. 1, the multi-display 100 includes a liquid-crystal display panel array 10 in which a plurality of liquid-crystal display panels 20 are arranged. The liquid-crystal display panel array 10 in the first embodiment consists of three liquid-crystal display panels 20 arranged in one column and three rows. The liquid-crystal display panel array 10 has joints 11 between the adjacent liquid-crystal display panels 20.

As illustrated in FIG. 2, the multi-display 100 also includes a front-surface protective plate 30 (i.e., a protective plate) disposed over a surface of the liquid-crystal display panel array 10 from which light is emitted (i.e., the viewer's-side surface), so as to cover the liquid-crystal display panel array 10. For easy illustration, the front-surface protective plate 30 is omitted in FIG. 1. The front-surface protective plate 30 is disposed in such a manner that its back surface 30b faces display surfaces 23 of the individual liquid-crystal display panels 20. The front-surface protective plate 30 has a front surface 30a provided with optical refractive devices 31a each of which is a V-shaped groove in cross-sectional view, and with flat portions 32 each of which has a flat surface. The optical refractive devices 31a are disposed along the respective joints 11 between the adjacent liquid-crystal display panels 20. The flat portions 32 are disposed to one-to-one correspond to active areas 24. The details of the active areas 24 will be described later on. The following details the configuration of the multi-display 100.

<Configuration of Liquid-Crystal Display Panel Array>

The liquid-crystal display panel array 10 includes the plurality of liquid-crystal display panels 20 that are arranged as illustrated in FIG. 1. This arrangement is non-limiting; the liquid-crystal display panels 20 are arranged in view of the uses of the multi-display 100, the size of the liquid-crystal display panels 20, and other things (e.g., a four-column and four-row arrangement). Moreover, the outline of the multi-display 100 may be any shape other than a quadrangle. Moreover, for a multi-display having any shape other than a quadrangle, the arrangement of the liquid-crystal display panels is not limited to a lattice arrangement.

Figure 3:
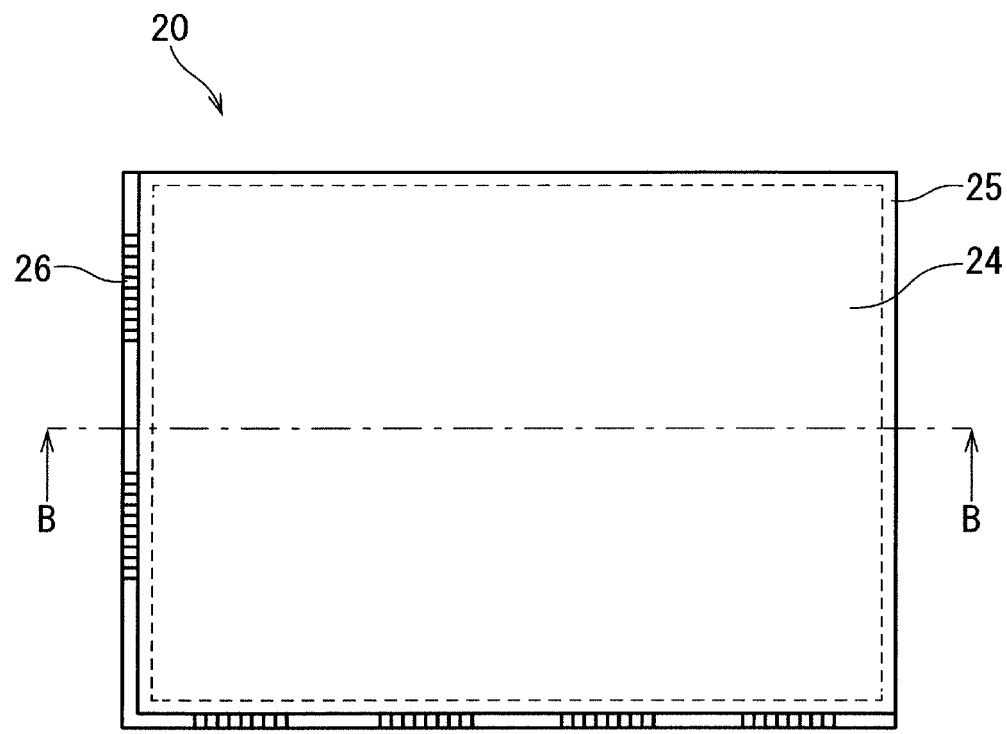
FIG. 3 is a plan view of the appearance of a liquid-crystal display panel included in the multi-display according to the first embodiment.
Figure 4:
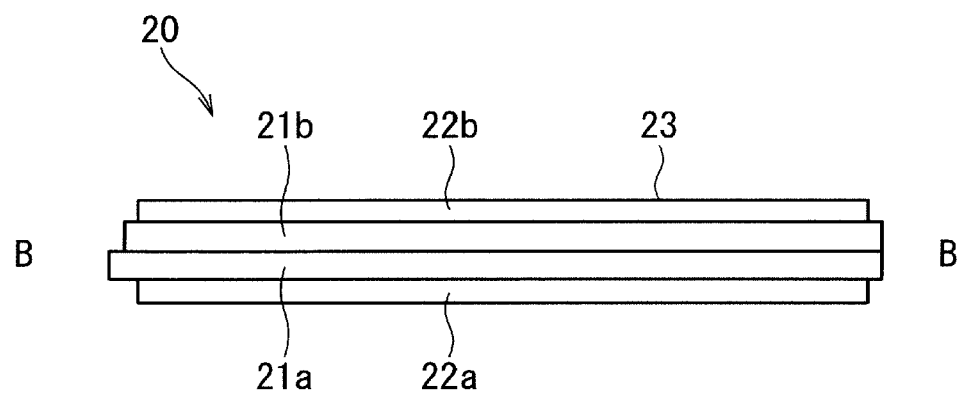
FIG. 4 is a cross-sectional view of the configuration of the liquid-crystal display panel included in the multi-display according to the first embodiment.

FIG. 3 is a plan view of the appearance of each liquid-crystal display panel 20 included in the multi-display 100. FIG. 4 is a cross-sectional view of each liquid-crystal display panel 20 taken along line B-B in FIG. 3. The liquid-crystal display panels 20 in the first embodiment have the same configuration.

As illustrated in FIG. 4, the liquid-crystal display panel 20 includes a first substrate 21a, a second substrate 21b facing the first substrate 21a, and a liquid-crystal layer (not shown) held between the first substrate 21a and the second substrate 21b. The second substrate 21b is closer to the viewer than the first substrate 21a, that is, the second substrate 21b is closer to the front-surface protective plate 30 illustrated in FIG. 2 than the first substrate 21a. As illustrated in FIG. 4, the first substrate 21a has a polarization plate 22a attached to its surface opposite the surface facing the second substrate 21b. Moreover, the second substrate 21b has a polarization plate 22b attached to its surface opposite the surface facing the first substrate 21a. Examples of the polarization plates 22a and 22b is a polarization film. Each of the polarization plates may be coated with a hard coating layer, an anti-glare layer, or an anti-reflection layer. The first substrate 21a and the second substrate 21b are each a rectangle in plan view.

The liquid-crystal display panel 20 has a flat display surface 23 disposed on the second substrate 21b. The display surface 23 has an active area 24 defined by a dotted line in FIG. 3. The active area 24 is a rectangular display region where images and pictures are displayed by the pixels in the liquid-crystal display panel 20. Defined outside the active area 24 is an inactive area 25 that is a frame region.

The inactive area 25 is provided with, for instance, wires (not shown) connected to components (e.g., thin-film transistors), and terminals 26 connected to a drive circuit (not shown). Although not shown for simple illustration, the inactive area 25 is also provided with a sealant sealing the liquid crystals, and with other components.

Although not shown as being less relevant to the invention, a liquid crystal display having such a liquid-crystal display panel 20 includes a backlight unit on a surface opposite the display surface 23 of the liquid-crystal display panel 20, that is on a surface of the liquid-crystal display panel 20 adjacent to the first substrate 21a. The liquid crystal display also includes flexible wires connecting the terminals 26 of the liquid-crystal display panel 20 to an external circuit, adhesive tape fastening the liquid-crystal display panel 20 to the casing, screws, and other components.

Figure 5:
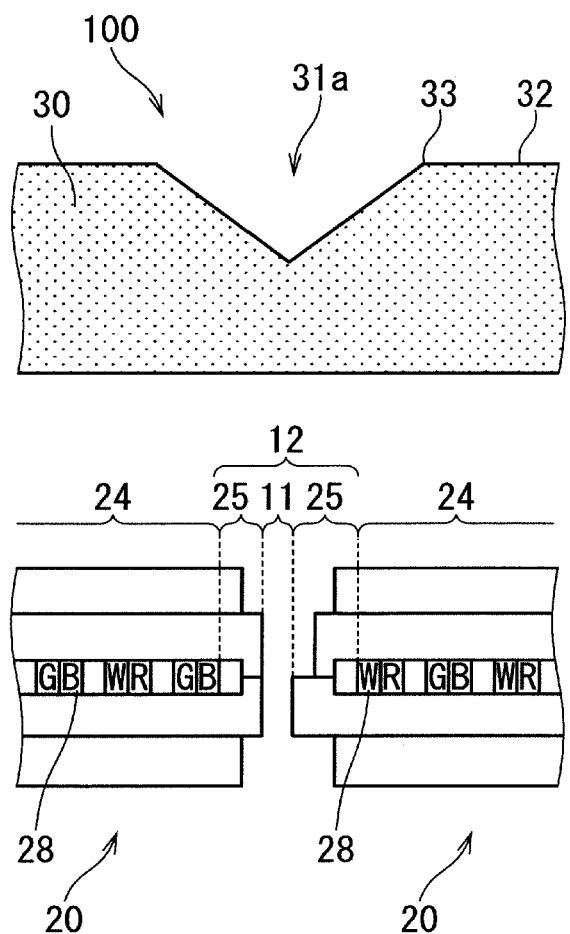
FIG. 5 is a cross-sectional view of the configuration around a joint of the multi-display according to the first embodiment.

FIG. 5 is a partial cross-sectional view of the multi-display 100 with the periphery of the joint 11 in FIG. 2 enlarged. As earlier described, the liquid-crystal display panel array 10 has the joints 11 between the adjacent liquid-crystal display panels 20. The width of each joint 11, that is, the interval between the adjacent liquid-crystal display panels 20, is determined according to, for instance, the accuracy in assembling the multi-display 100, specifications including size and definition, the size of the liquid-crystal display panel, and the dimension of the inactive area 25. It is noted that each joint 11, although being 1 mm wide in the first embodiment, may have any width. It is also noted that although, in the first embodiment, all the joints 11 have the same width in the liquid-crystal display panel array 10, different joints 11 may have different widths. It is also noted that the adjacent liquid-crystal display panels 20 may be adjoining and thus may be seamless.

As illustrated in FIG. 1, the liquid-crystal display panel array 10 has non-display regions 12. As illustrated in FIG. 5, each non-display region 12 includes the joint 11 and the inactive areas 25. The non-display region 12 is a region defined between the active areas 24 of the adjacent liquid-crystal display panels 20, and the non-display region 12 extends along at least one side of the liquid-crystal display panel 20.

<Configuration of Front-Surface Protective Plate>

As illustrated in FIG. 2, the front-surface protective plate 30 has the front surface 30a and the back surface 30b. The back surface 30b is a flat surface facing the flat display surfaces 23 of the individual liquid-crystal display panels 20. The front surface 30a has the optical refractive devices 31a whose shapes are each a V-shaped groove in cross-sectional view, and the flat portions 32 each of which has a flat surface. While viewing the multi-display 100, the viewer sees images and pictures displayed in the active areas 24, from the front surface 30a.

The polarization plate 22b of each liquid-crystal display panel 20 and the back surface 30b of the front-surface protective plate 30 may be bonded with a transparent adhesive or other things. Alternatively, the polarization plate 22b and the back surface 30b may face each other with a space therebetween. In the first embodiment, there is a space between the polarization plate 22b and the back surface 30b. The distance of the space is set in such a manner that multi-reflection between the back surface 30b and the liquid-crystal display panel 20 does not generate interference fringes.

An anti-reflection coating and a film having an anti-reflection function may be disposed between the polarization plate 22b and the front-surface protective plate 30 when the polarization plate 22b of the liquid-crystal display panel 20 and the back surface 30b of the front-surface protective plate 30 are disposed with a space therebetween. The shape of the front-surface protective plate 30 in plan view is determined according to the shape and specifications of the multi-display 100; for instance, the front-surface protective plate 30 can be a rectangle, a polygon, or a circle in plan view. The appearance of the front-surface protective plate 30 is not limited to these shapes.

The outside size of the front-surface protective plate 30 is determined according to the shape and specifications of the multi-display 100. The thickness of the flat portion 32 of the front-surface protective plate 30 is set as appropriate, in view of, for instance, mechanical strength and weight that are required according to the shape and size of the multi-display 100. The thickness of the flat portion 32 preferably ranges from 1 to 50 mm.

The front-surface protective plate 30 is preferably a transparent plate having a transmittance of visible light equal to or more than 80%, and is preferably made of a single material. The front-surface protective plate 30 may be, for instance, a glass plate, a laminated glass plate, or a resin plate each of which is processed using a method, such as ion exchange or toughening by air cooling, to thus have improved strength. Polycarbonate resin, acrylic resin, cycloolefin resin, or other resins are suitable for the resin plate. It is noted that these materials of the front-surface protective plate 30 are non-limiting. It is also noted that the front-surface protective plate 30 is produced through any method; for instance, cutting, polishing, injection molding, extrusion molding, or compression molding is used. The front-surface protective plate 30 in the first embodiment is made of a single material, that is, acrylic resin, and is produced through injection molding. The front-surface protective plate 30, which is made of a single material, has a uniform refractive index in its inside. Since no optical boundaries are generated, phenomenon such as light reflection does not occur inside the front-surface protective plate 30. Consequently, the display quality of the multi-display 100 does not degrade. Furthermore, the front-surface protective plate 30 is preferably produced using a production method that does not create optical anisotropy within a range that does not change the optical properties of the liquid crystals, or is preferably produced under an optimal production condition.

<Configuration of Optical Refractive Device>

As illustrated in FIG. 2, the shape of the optical refractive devices 31a in the first embodiment is a V-shaped groove. Moreover, as illustrated in FIGS. 1 and 2, the optical refractive devices 31a are disposed along the individual joints 11 between the adjacent liquid-crystal display panels 20. Moreover, as illustrated in FIG. 5, the flat portions 32 are disposed over the individual active areas 24.

Each optical refractive device 31a in the first embodiment extends astride the non-display region 12. FIG. 6 is a partial cross-sectional view of the multi-display 100 with the periphery of the joint 11 in FIG. 2 enlarged. FIG. 6 shows a width W1 of the optical refractive device 31a and a width W2 of the non-display region 12. As illustrated in FIG. 6, the width W1 of the optical refractive device 31a is set to be greater than the width W2 of the non-display region 12; thus, the optical refractive device 31a extends astride the non-display region 12.

The optical refractive device 31a has two flat surfaces that are symmetrical with respect to the deepest part of the V-shaped groove and are non-parallel to each other. These two surfaces of the optical refractive device 31a each include a straight line or arc that is non-parallel to the back surface 30b or the flat portion 32 in cross-sectional view. These two surfaces are set as necessary, according to the size of the liquid-crystal display panel 20, the size of the pixel, the size of the joint 11, and other things. To enhance mechanical strength, the flat portion 32 of the front-surface protective plate 30 desirably has a thickness twice or more as large as the groove depth of the optical refractive device 31a.

The cross-sectional shape of the optical refractive device 31a is not limited to a V-shaped groove. For instance, the multi-display 100 may include optical refractive devices 31b shown in FIG. 7, instead of the optical refractive devices 31a shown in FIG. 5. FIG. 8 is a partial cross-sectional view of the multi-display 100 with the periphery of the joint 11 in FIG. 7 enlarged. As illustrated in FIG. 8, the shape of each optical refractive device 31b is a groove whose inner surface consists of one curved surface 311b. The curved surface 311b is a hollow surface that is dented with respect to the plane of the flat portion 32.

Figure 9:
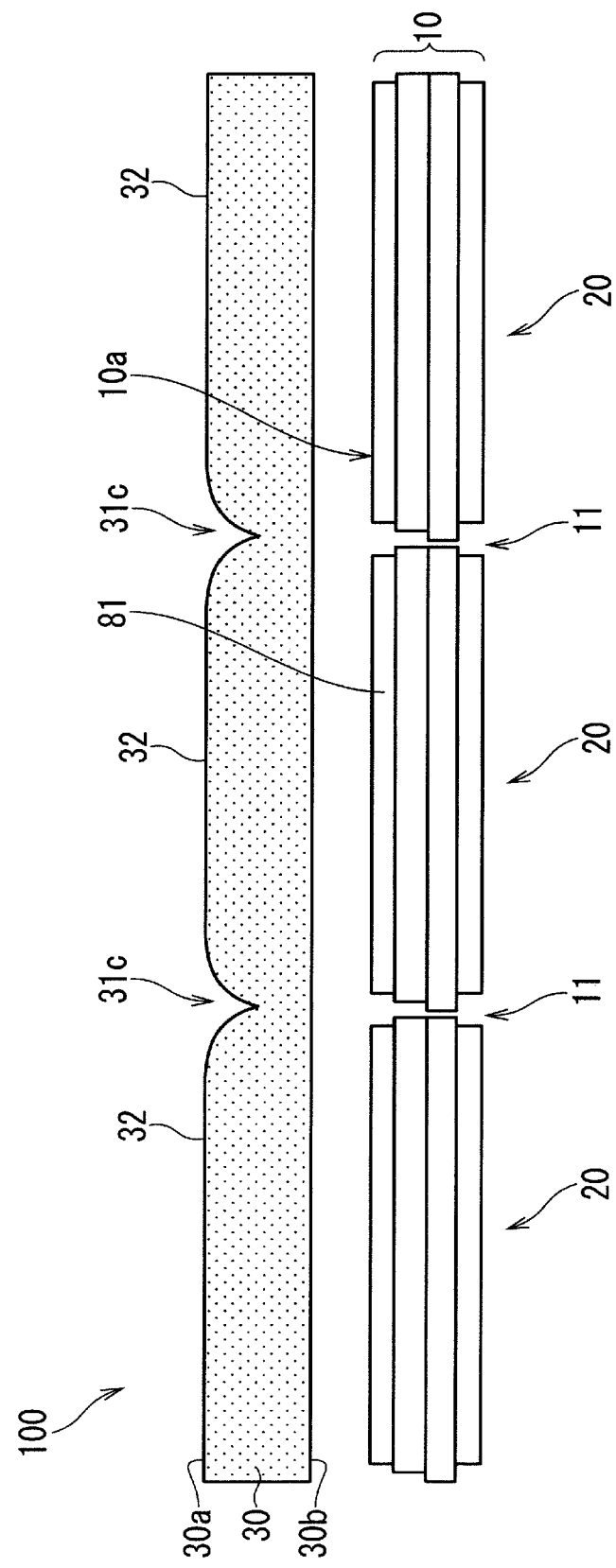
FIG. 9 is a cross-sectional view of still another configuration of the multi-display according to the first embodiment.

Alternatively, the multi-display 100 may include optical refractive devices 31c shown in FIG. 9, instead of the optical refractive devices 31a shown in FIG. 5. FIG. 10 is a partial cross-sectional view of the multi-display 100 with the periphery of the joint 11 in FIG. 9 enlarged. As illustrated in FIG. 10, the shape of each optical refractive device 31b is a groove consisting of two curved surfaces 311c that are symmetrical with respect to the deepest part of the groove. The two curved surfaces 311c are each a protruding surface that is protruding with respect to the plane of the flat portion 32. The contact between the two curved surfaces 311c is the deepest part of the groove.

The aforementioned optical refractive devices 31a, 31b, and 31c each serve as a lens that refracts the light emitted from the active area 24 of the liquid-crystal display panel 20, and thus enlarges the images and the pictures.

It is noted that although the grooves of the optical refractive devices 31a and 31c in this embodiment each have such a shape as to be symmetrical with respect to the deepest part of the groove in cross-sectional view, these grooves do not necessarily have to be symmetrical with respect to the deepest part; these grooves are designed as appropriate, on the basis of display performance required for the multi-display 100.

While viewing the multi-display 100, the viewer sees the images and pictures displayed in the active areas 24, from the front surface 30a of the front-surface protective plate 30. Meanwhile, the viewer, while viewing the multi-display 100, sees the non-display regions 12 as connection parts between the liquid-crystal display panels 20. The non-display regions 12 thus hinder image continuity and picture continuity. The non-display regions 12 affect the display quality of the multi-display 100. However, forming, for example, the optical refractive devices 31a in the front-surface protective plate 30 enlarges the images and pictures displayed in the active areas 24 to the non-display regions 12, thereby enabling the viewer to less see the non-display regions 12.

<Boundary and Curve>

FIG. 11 is a partial cross-sectional view of the optical refractive device 31a in each joint 11. The front-surface protective plate 30 includes boundaries 33 at which flat surfaces 311a constituting the V-shaped groove of the individual optical refractive devices 31a are connected to the flat portions 32. The boundaries 33 are disposed at both sides of the V-shaped groove of the optical refractive device 31a. FIG. 12 is an enlarged view of region C including the boundary 33 illustrated in FIG. 11.

As illustrated in FIG. 12, the front-surface protective plate 30 includes curves 35 at the boundaries 33. Each curve 35 gently connects the flat surface 311a, forming the V-shaped groove of the optical refractive device 31a, and the flat portion 32 to each other. Each curve 35 includes an arc in cross-sectional view. The arc has a center of curvature 35a located in a position that is more adjacent to the liquid-crystal display panel array 10 (FIG. 2) than the front surface 30a of the front-surface protective plate 30; that is, the center of curvature 35a is located inside the front-surface protective plate 30. Moreover, each boundary 33 has one end 331 where the boundary 33 is connected to the flat portion 32. The one end 331 is a position, for instance, where the gradient of the arc starts to vary from the flat portion 32 toward the optical refractive device 31a, and the one end 331 is disposed above the active area 24. The boundary 33 also has another end 332 that is a position where the gradient of the arc starts to vary from the flat surface 311a of the optical refractive device 31a toward the flat portion 32. As described above, the arc of the curve 35 gently connects a straight line forming the flat surface 311a and a straight line forming the flat portion 32. That is, the curve 35 connects the flat surface 311a to the flat portion 32 in a differentiable and continuous manner FIG. 12 shows a width W3 of the curve 35, which is the length between the orthogonal projections of the one end 331 and other end 332 of the boundary 33. Although the width W3 ranges from 30 to 500 µm, depending on the processing accuracy of the front-surface protective plate 30, a smaller width value is desirable.

Figure 7:
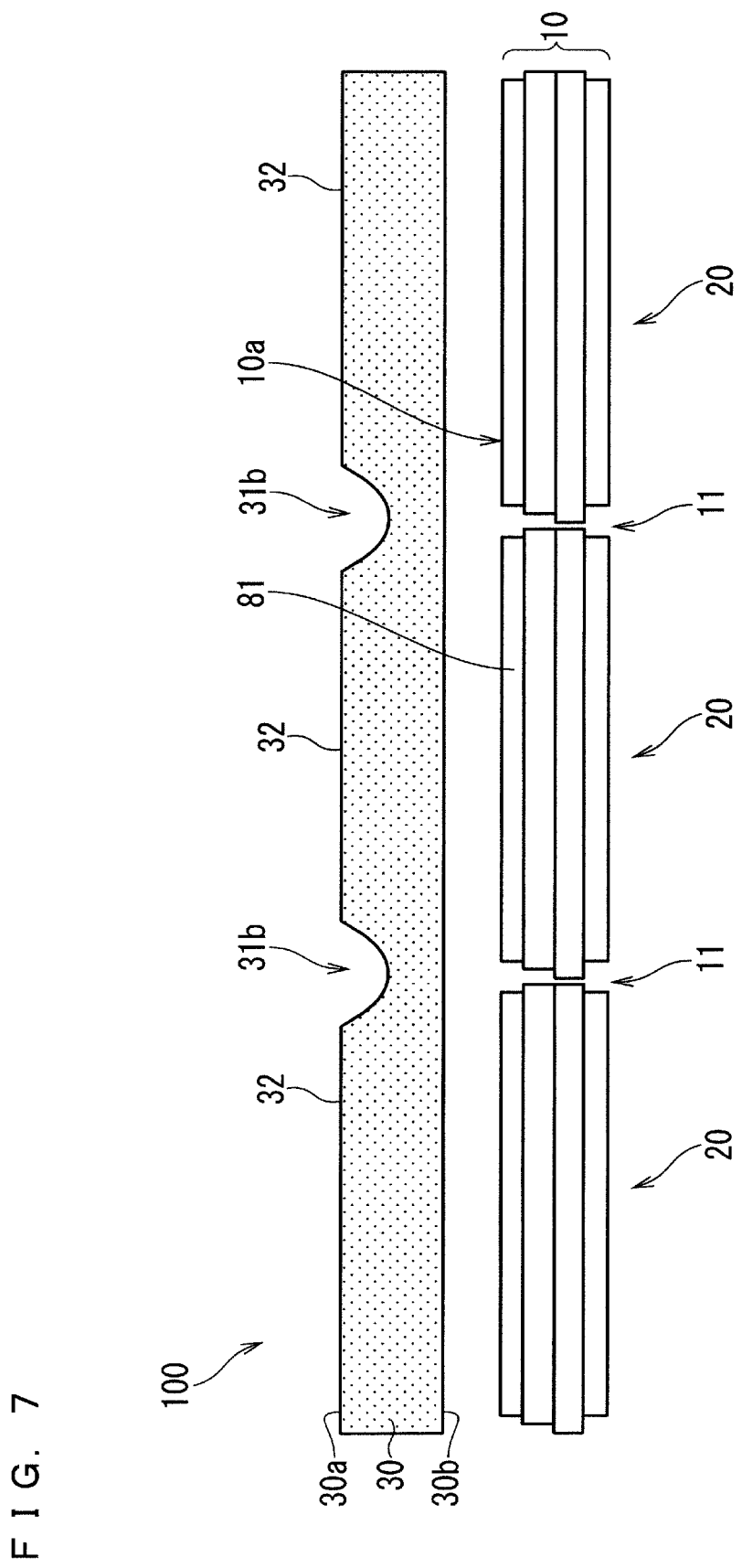
FIG. 7 is a cross-sectional view of another configuration of the multi-display according to the first embodiment.

Although not shown, a similar configuration is established when the front-surface protective plate 30 includes the optical refractive devices 31b (FIG. 7). That is, one end of each boundary 33 at which the boundary 33 is connected to the flat portion 32 is a position where the arc gradient starts to vary from the flat portion 32 toward the optical refractive device 31b. In addition, the other end of the boundary 33 is a point where the direction of the arc gradient starts to vary from the curved surface 311b of the optical refractive device 31b toward the flat portion 32; that is, the other end is a point of inflection.

It is noted that the curve 35, although including an arc having one center of curvature 35a in the first embodiment, may include a plurality of arcs that have mutually different centers of curvature and are continuously connected to each other.

<Pixel Arrangement of Liquid-Crystal Display Panel>

Figure 13:
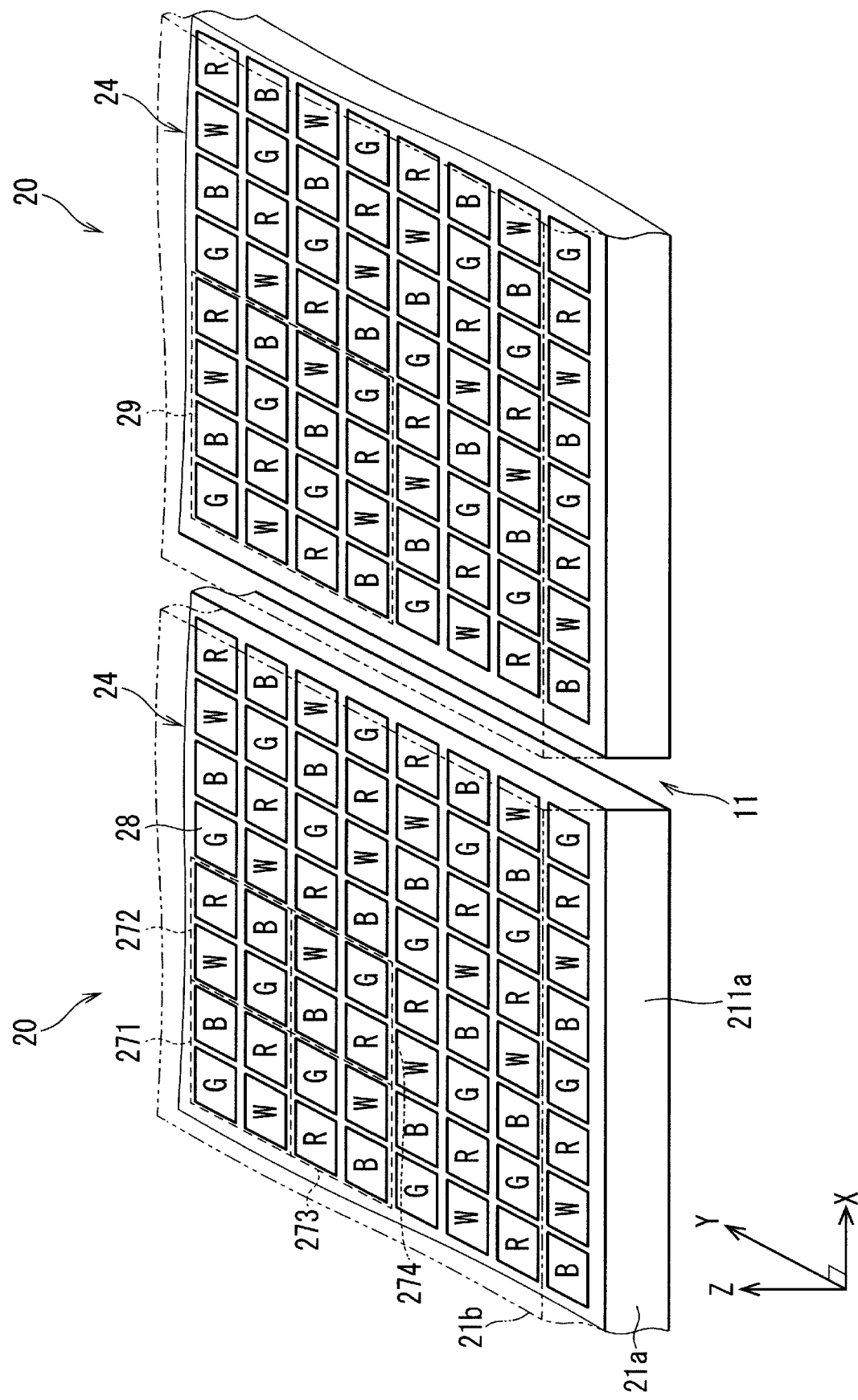
FIG. 13 is a perspective view near the joint between the liquid-crystal display panels included in the multi-display according to the first embodiment.

FIG. 13 is a perspective view near each joint 11 between the liquid-crystal display panels 20. FIG. 13 illustrates the arrangement of the plurality of pixels within the liquid-crystal layer (not shown), which is held between the first substrate 21a and the second substrate 21b. Components such as the front-surface protective plate 30 and each polarization plate are omitted in the perspective views of the liquid-crystal display panels 20 illustrated in the following drawings including FIG. 13.

As illustrated in FIG. 13, the liquid-crystal display panels 20 each have a plurality of pixel groups 29 arranged within the active area 24. Each pixel groups 29 consists of pixels 271, 272, 273, and 274. Each pixel consists of sub-pixels of four colors: a sub-pixel 28 having a display color of white (W), a sub-pixel 28 having a display color of red (R), a sub-pixel 28 having a display color of green (G), and a sub-pixel 28 having a display color of blue (B). The arrangement of the sub-pixels 28 is different between the pixels 271 to 274. In other words, the pixels adjacent to each other in a direction (the Y-direction in FIG. 13) parallel to a direction in which the joint 11 extends, have mutually different display color arrangements of the sub-pixels; moreover, the pixels adjacent to each other in a direction (i.e., the X-direction in FIG. 13) orthogonal to the direction in which the joint 11 extends, have mutually different display color arrangements of the sub-pixels.

The liquid-crystal display panels 20 display the images and the pictures by changing a signal that drives each sub-pixel 28. For instance, turning on all the sub-pixels 28 of white (W), red (R), green (G), and blue (B) displays white, and turning on the sub-pixels 28 of red (R) and green (G) displays yellow.

Here, the sub-pixel 28 having a display color of white (W) can transmit the light from the backlight through a transparent filter. The sub-pixel 28 having a display color of white (W) may be obtained by establishing a situation that is substantially equivalent to white display obtained by making sub-pixels of red (R), green (G), and blue (B) emit light. Such an equivalent situation is established by placing color filters of red (R), green (G), and blue (B) in a single sub-pixel 28, and by determining the area of these color filters as appropriate.

Reference is made to the pixel 271. The green (G) sub-pixel 28 and the blue (B) sub-pixel 28 are arranged in this order in the longitudinal direction of the liquid-crystal display panel 20 (i.e., the X-direction in FIG. 13), in a direction from a position distant to the joint 11 toward the joint 11. In addition, the white (W) sub-pixel 28 is disposed next to the green (G) sub-pixel 28, and the red (R) sub-pixel 28 is disposed next to the blue (B) sub-pixel 28, in the lateral direction of the liquid-crystal display panel 20 (i.e., the Y-direction in FIG. 13), in a direction toward an end 211a of the liquid-crystal display panel 20.

Reference is made to the pixel 272. The white (W) sub-pixel 28 and the red (R) sub-pixel 28 are arranged in this order in the longitudinal direction of the liquid-crystal display panel 20 (i.e., the X-direction in FIG. 13), in the direction from the position distant to the joint 11 toward the joint 11. In addition, the green (G) sub-pixel 28 is disposed next to the white (W) sub-pixel 28, and the blue (B) sub-pixel 28 is disposed next to the red (R) sub-pixel 28, in the lateral direction of the liquid-crystal display panel 20 (i.e., the Y-direction in FIG. 13), in the direction toward the end 211a of the liquid-crystal display panel 20.

Reference is made to the pixel 273. The red (R) sub-pixel 28 and the green (G) sub-pixel 28 are arranged in this order in the longitudinal direction of the liquid-crystal display panel 20 (i.e., the X-direction in FIG. 13), in the direction from the position distant to the joint 11 toward the joint 11. In addition, the blue (B) sub-pixel 28 is disposed next to the red (R) sub-pixel 28, and that the white (W) sub-pixel 28 is disposed next to the green (G) sub-pixel 28, in the lateral direction of the liquid-crystal display panel 20 (i.e., the Y-direction in FIG. 13), in the direction toward the end 211a of the liquid-crystal display panel 20.

Reference is made to the pixel 274. The blue (B) sub-pixel 28 and the white (W) sub-pixel 28 are arranged in this order in the longitudinal direction of the liquid-crystal display panel 20 (i.e., the X-direction in FIG. 13), in the direction from the position distant to the joint 11 toward the joint 11. In addition, the red (R) sub-pixel 28 is disposed next to the blue (B) sub-pixel 28, and the green (G) sub-pixel 28 is disposed next to the white (W) sub-pixel 28, in the lateral direction of the liquid-crystal display panel 20 (i.e., the Y-direction in FIG. 13), in the direction toward the end 211a of the liquid-crystal display panel 20.

The sub-pixels 28, constituting the individual pixels 271 to 274, are squares of the same size in plan view, and are arranged at intervals in two columns and two rows. Moreover, the pixels 271 to 274 are squares of the same size in plan view.

Reference is made to each pixel group 29. The pixel 271 and the pixel 272 are arranged in this order in the longitudinal direction of the liquid-crystal display panel 20 (i.e., the X-direction in FIG. 13), in the direction from the position distant to the joint 11 toward the joint 11. In addition, the pixel 273 is disposed next to the pixel 271, and the pixel 274 is disposed next to the pixel 272, in the lateral direction of the liquid-crystal display panel 20 (i.e., the Y-direction in FIG. 13), in the direction toward the end 211a of the liquid-crystal display panel 20. The pixels 271 to 274 are arranged in two columns and two rows as well.

The pixel groups 29 are periodically arranged in the longitudinal direction (i.e., the X-direction) and the lateral direction (i.e., the Y-direction) of the liquid-crystal display panel 20. It is noted that the shape and size of the sub-pixels 28 is non-limiting; the sub-pixels 28 each may be a rectangle in plan view, or each may include an arc. Further, the sub-pixels 28 of the different display colors may have different sizes; their sizes are designed as appropriate, on the basis of display performance required for the multi-display 100 and other things.

It is also noted that the arrangement of the sub-pixels 28 illustrated in FIG. 13 is one example; the sub-pixels 28 need to be arranged in such a manner that the sub-pixels 28 of two or more different display colors are disposed between the sub-pixels 28 of the same display color in a direction parallel to the joint 11 (i.e., the Y-direction).

Figure 14:
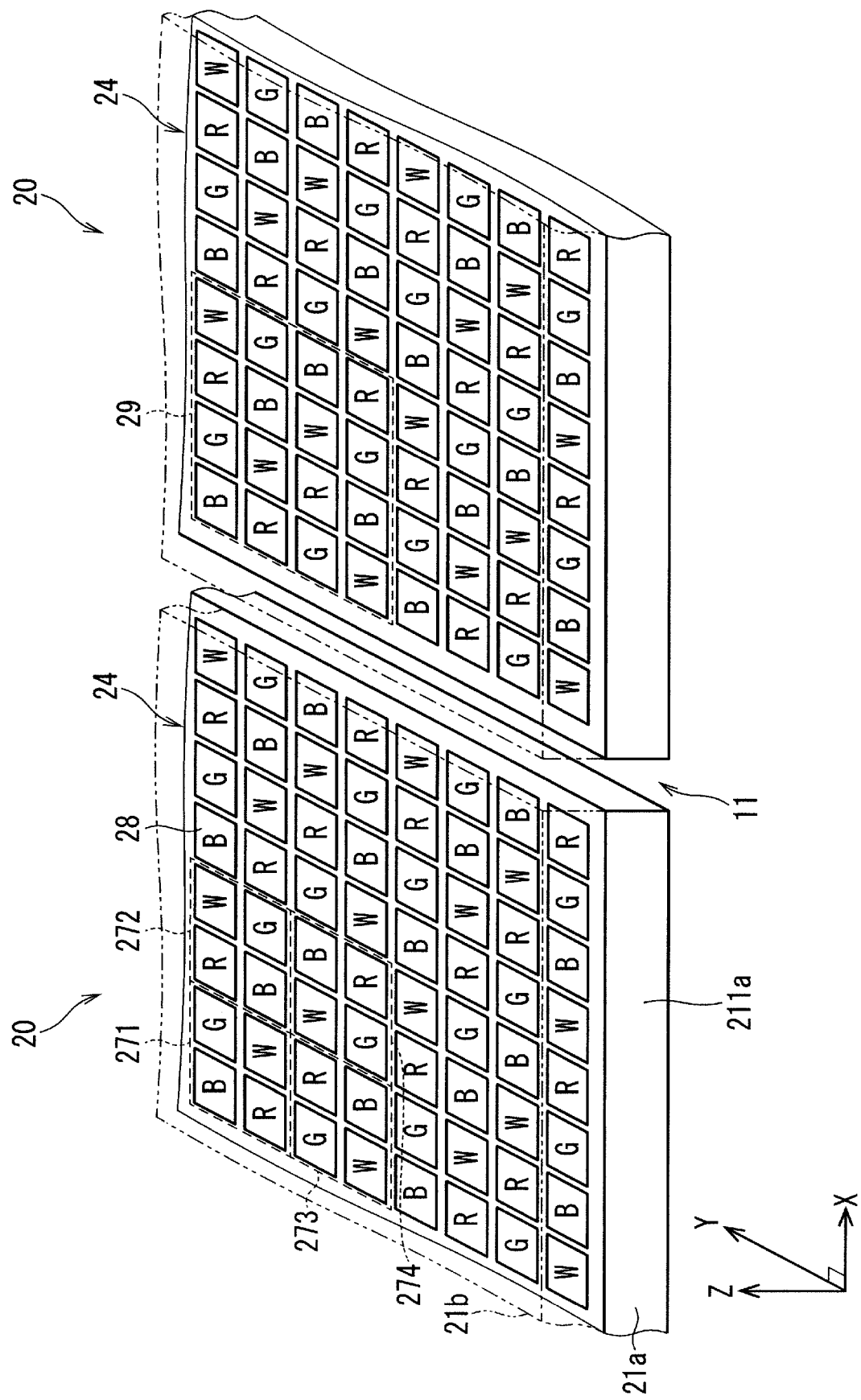
FIG. 14 is a perspective view near the joint between the liquid-crystal display panels included in the multi-display according to the first embodiment.

FIG. 14 is a perspective view of another example of the arrangement of the sub-pixels 28. Reference is made to the pixel 271 in FIG. 14. The blue (B) sub-pixel 28 and the green (G) sub-pixel 28 are arranged in this order in the longitudinal direction of the liquid-crystal display panel 20 (the X-direction in FIG. 14), in a direction from a position distant to the joint 11 toward the joint 11. In addition, the red (R) sub-pixel 28 is disposed next to the blue (B) sub-pixel 28, and the white (W) sub-pixel 28 is disposed next to the green (G) sub-pixel 28, in the lateral direction of the liquid-crystal display panel 20 (the Y-direction in FIG. 14), in a direction toward the end 211*a* of the liquid-crystal display panel 20.

Reference is made to the pixel 272. The red (R) sub-pixel 28 and the white (W) sub-pixel 28 are arranged in this order in the longitudinal direction of the liquid-crystal display panel 20 (i.e., the X-direction), in the direction from the position distant to the joint 11 toward the joint 11. In addition, the blue (B) sub-pixel 28 is disposed next to the red (R) sub-pixel 28, and the green (G) sub-pixel 28 is disposed next to the white (W) sub-pixel 28, in the lateral direction of the liquid-crystal display panel 20 (i.e., the Y-direction), in the direction toward the end 211*a* of the liquid-crystal display panel 20.

Reference is made to the pixel 273. The green (G) sub-pixel 28 and the red (R) sub-pixel 28 are arranged in this order in the longitudinal direction of the liquid-crystal display panel 20 (i.e., the X-direction), in the direction from the position distant to the joint 11 toward the joint 11. In addition, the white (W) sub-pixel 28 is disposed next to the green (G) sub-pixel 28, and the blue (B) sub-pixel 28 is disposed next to the red (R) sub-pixel 28, in the lateral direction of the liquid-crystal display panel 20 (i.e., the Y-direction), in the direction toward the end 211*a* of the liquid-crystal display panel 20.

Reference is made to the pixel 274. The white (W) sub-pixel 28 and the blue (B) sub-pixel 28 are arranged in this order in the longitudinal direction of the liquid-crystal display panel 20 (i.e., the X-direction), in the direction from the position distant to the joint 11 toward the joint 11. In addition, the green (G) sub-pixel 28 is disposed next to the white (W) sub-pixel 28, and the red (R) sub-pixel 28 is disposed next to the blue (B) sub-pixel 28, in the lateral direction of the liquid-crystal display panel 20 (i.e., the Y-direction), in the direction toward the end 211*a* of the liquid-crystal display panel 20. Furthermore, the arrangement of the pixels 271 to 274 is the same as that illustrated in FIG. 13.

It is noted that each pixel, although consisting of the sub-pixels 28 of the four colors in FIGS. 13 and 14, may consist of the sub-pixels 28 of three colors.

Figure 15:
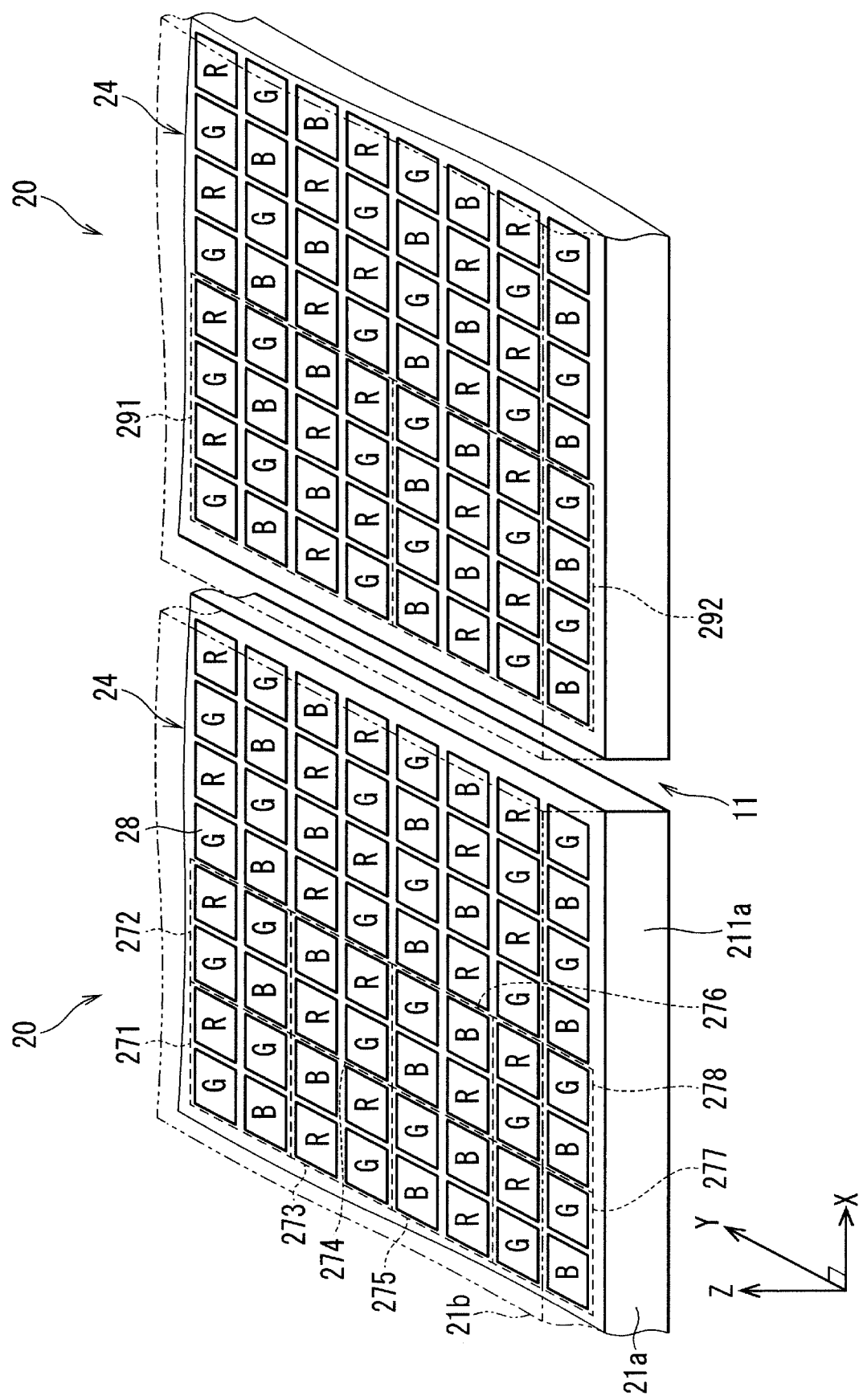
FIG. 15 is a perspective view near the joint between the liquid-crystal display panels included in the multi-display according to the first embodiment.

FIG. 15 is a perspective view of an example of sub-pixel arrangement in a configuration where each pixel consists of sub-pixels of three display colors: red (R), green (G), and blue (B). FIG. 15 shows that two pixel groups 291 and 292 in the active area 24 are alternately arranged in the lateral direction of the liquid-crystal display panel 20 (i.e., the Y-direction in FIG. 15). Each pixel group 291 consists of the pixels 271, 272, 273, and 274, and each pixel group 292 consists of pixels 275, 276, 277, and 278.

Reference is made to the pixel 271 of the pixel group 291. One of the green (G) sub-pixels 28 and the red (R) sub-pixel 28 are arranged in this order in the longitudinal direction of the liquid-crystal display panel 20 (i.e., the X-direction), in a direction from a position distant to the joint 11 toward the joint 11. In addition, the blue (B) sub-pixel 28 is disposed next to the one green (G) sub-pixel 28, and the other one of the green (G) sub-pixels 28 is disposed next to the red (R) sub-pixel 28, in the lateral direction of the liquid-crystal display panel 20 (i.e., the Y-direction), in a direction toward the end 211*a* of the liquid-crystal display panel 20. Furthermore, the sub-pixel arrangement in the pixel 272 is the same as that in the pixel 271.

Reference is made to the pixel 273 of the pixel group 291. One of the red (R) sub-pixels 28 and the blue (B) sub-pixel 28 are arranged in this order in the longitudinal direction of the liquid-crystal display panel 20 (i.e., the X-direction), in the direction from the position distant to the joint 11 toward the joint 11. In addition, the green (G) sub-pixel 28 is disposed next to the one red (R) sub-pixel 28, and the other one of the red (R) sub-pixels 28 is disposed next to the blue (B) sub-pixel 28, in the lateral direction of the liquid-crystal display panel 20 (i.e., the Y-direction), in the direction toward the end 211*a* of the liquid-crystal display panel 20. Furthermore, the sub-pixel arrangement in the pixel 274 is the same as that in the pixel 273.

Reference is made to the pixel 275 of the pixel group 292. One of the blue (B) sub-pixels 28 and the green (G) sub-pixel 28 are arranged in this order in the longitudinal direction of the liquid-crystal display panel 20 (i.e., the X-direction), in the direction from the position distant to the joint 11 toward the joint 11. In addition, the red (R) sub-pixel 28 is disposed next to the one blue (B) sub-pixel 28, and the other one of the blue (B) sub-pixels 28 is disposed next to the green (G) sub-pixel 28, in the lateral direction of the liquid-crystal display panel 20 (i.e., the Y-direction), in the direction toward the end 211*a* of the liquid-crystal display panel 20. Furthermore, the sub-pixel arrangement in the pixel 276 is the same as that in the pixel 275.

Reference is made to the pixel 277 of the pixel group 292. One of the green (G) sub-pixels 28 and the red (R) sub-pixel 28 are arranged in this order in the longitudinal direction of the liquid-crystal display panel 20 (i.e., the X-direction), in the direction from the position distant to the joint 11 toward the joint 11. In addition, the blue (B) sub-pixel 28 is disposed next to the one green (G) sub-pixel 28, and the other one of the green (G) sub-pixels 28 is disposed next to the red (R) sub-pixel 28, in the lateral direction of the liquid-crystal display panel 20 (i.e., the Y-direction), in the direction toward the end 211*a* of the liquid-crystal display panel 20. Furthermore, the sub-pixel arrangement in the pixel 278 is the same as that in the pixel 277.

As such, in each of the aforementioned pixels consisting of the sub-pixels 28 of the three colors, the sub-pixels 28 are arranged in such a manner that the sub-pixels 28 of two or more different display colors are disposed between the sub-pixels 28 of the same display color, in a direction parallel to the joint 11 (i.e., the Y-direction). In other words, the pixels adjacent to each other in a direction parallel to the direction where the joint 11 extends, have mutually different display-color arrangements of the sub-pixels.

When consisting of the sub-pixels of the three colors, each pixel has a simple configuration. When consisting of the sub-pixels of the four colors, each pixel has more sub-pixels of the different display colors between the sub-pixels of the same display color, thereby further preventing a monochrome bright line.

<Effect>

As described above, the liquid-crystal display panels 20 of the multi-display 100 according to the first embodiment each have the following pixel arrangement. That is, the sub-pixels 28 are arranged in such a manner that the sub-pixels 28 of the two or more different display colors are disposed between the sub-pixels 28 of the same display color, in the direction parallel to the joint 11 (i.e., the Y-direction). This arrangement achieves favorable display quality without any monochrome bright lines found.

The sub-pixels 28 are arranged in such a manner that the sub-pixels 28 of the two or more different display colors are disposed between the sub-pixels 28 of the same display color, in the direction parallel to the joint 11. That is, the sub-pixels 28 are arranged in such a manner that the sub-pixels 28 of the two or more different display colors are disposed between the sub-pixels 28 of the same display color, in a direction where the boundary 33 including the curve 35 of the front-surface protective plate 30 extends. This arrangement prevents monochrome bright lines found at the boundaries 33 in mixed-color display (e.g., in white display and yellow display). As earlier described, a monochrome bright line is found at the boundary 33 when the light from the liquid-crystal display panel is separated into the individual colors of the sub-pixels. This problem is solved by the above arrangement, that is, the sub-pixels 28 in parallel to the boundary 33 of the front-surface protective plate 30 are arranged in such a manner that the sub-pixels 28 of the same display color sandwich the sub-pixels 28 of the two or more different display colors. This arrangement renders the light from the sub-pixels of the individual colors less separated, thereby reducing monochrome bright lines, which result from a particular color continuously found at the boundaries 33 in mixed-color display.

Moreover, the sub-pixels 28 are arranged in such a manner the sub-pixels 28 of the same display color sandwich the sub-pixels 28 of the two or more display colors, in the longitudinal direction of the liquid-crystal display panel 20 (i.e., a direction orthogonal to the joint 11). This arrangement prevents bright lines found at the boundaries 33 in the longitudinal and lateral directions when the liquid-crystal display panels 20 are arranged, for instance, in two columns and three rows.

In this way, the multi-display 100 according to the first embodiment reduces, in mixed-color display, monochrome bright lines found at the boundaries of the optical refractive devices in the front-surface protective plate 30, thus providing display of high quality without display panel joints viewed from a user.

Second Embodiment

The shape and arrangement of the sub-pixels 28 in a multi-display according to a second embodiment are different from those of the sub-pixels 28 in the multi-display 100 according to the first embodiment. The configuration of the multi-display in the second embodiment except the shape and arrangement of the sub-pixels 28 is similar to that of the multi-display 100 in the first embodiment. Accordingly, the similar configuration, which is redundant, will not be elaborated upon.

Although the shape and arrangement of the sub-pixels 28 are different from that in the first embodiment, the multi-display in this embodiment achieves an effect similar to that achieved by the multi-display 100 in the first embodiment. That is, the multi-display reduces, in mixed-color display, bright lines found at the boundaries 33 of the optical refractive devices 31a in the front-surface protective plate 30.

Figure 16:
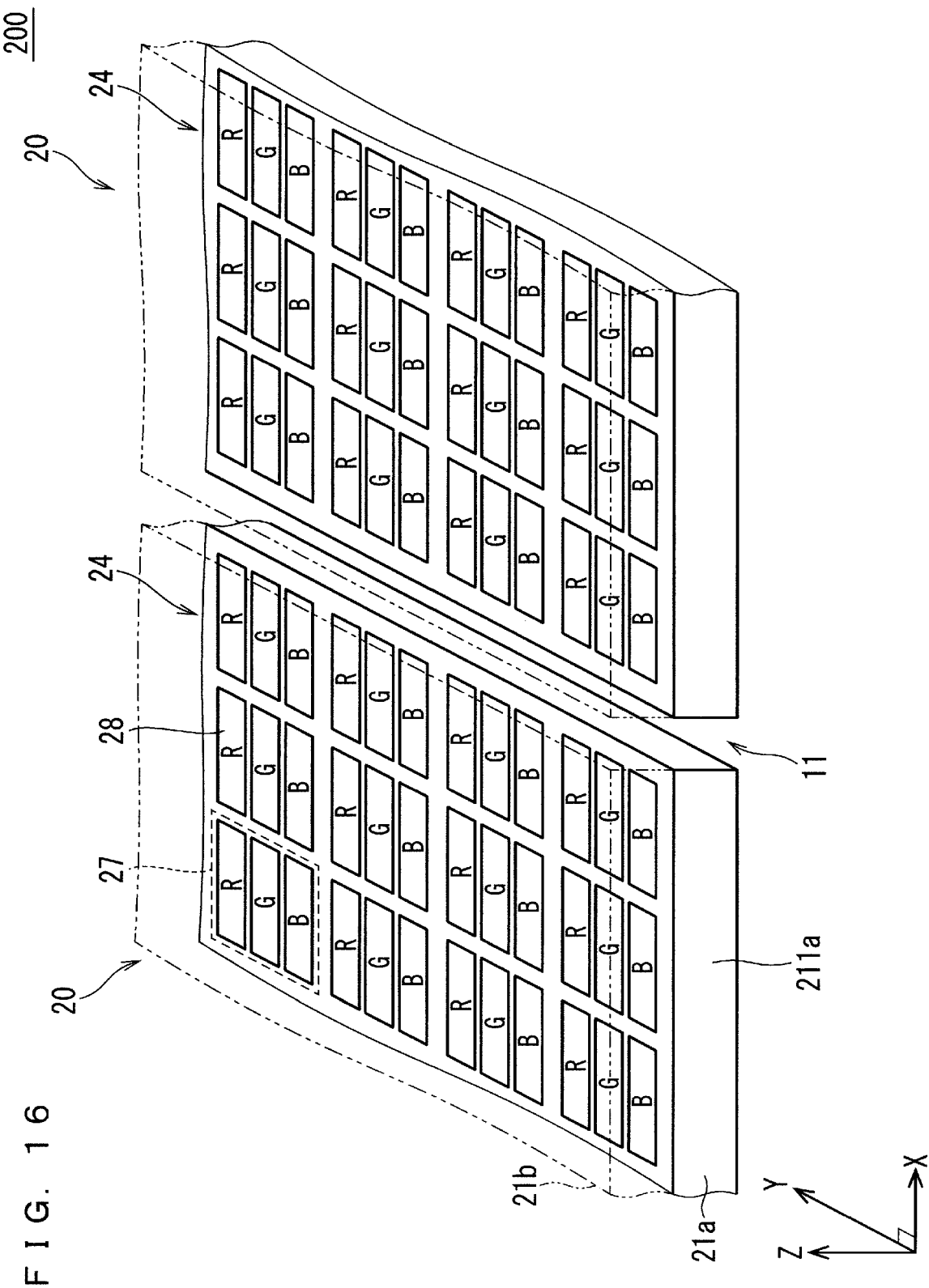
FIG. 16 is a perspective view near the joint between the liquid-crystal display panels included in a multi-display according to a second embodiment.

FIG. 16 is a perspective view near each joint 11 between the liquid-crystal display panels 20 included in the multi-display (i.e., a multi-display 200) according to the second embodiment of the present invention. FIG. 13 illustrates the arrangement of a plurality of pixels disposed in a liquid-crystal layer (not shown) held between the first substrate 21a and the second substrate 21b. Components such as the front-surface protective plate 30 and each polarization plate are omitted in the perspective views of the liquid-crystal display panels 20 that are illustrated in the following drawings including FIG. 16.

As illustrated in FIG. 16, the liquid-crystal display panels 20 each have a plurality of pixels 27 arranged within the active area 24. Each pixel 27 consists of sub-pixels of three colors: a sub-pixel 28 having a display color of red (R), a sub-pixel 28 having a display color of green (G), and a sub-pixel 28 having a display color of blue (B).

The sub-pixels 28 are each a rectangle in plan view. The longer sides of the rectangle are parallel to the longitudinal direction of the liquid-crystal display panel 20 (i.e., the X-direction in FIG. 16), and the shorter sides of the same are parallel to the lateral direction of the liquid-crystal display panel 20 (i.e., the Y-direction in FIG. 16). The sub-pixels 28 are arranged in the order of blue (B), green (G), and red (R) when viewed from the end 211a of the liquid-crystal display panel.

All the sub-pixels 28 are of the same size in plan view, and are arranged in such a manner that their individual shorter sides are aligned in the lateral direction of the liquid-crystal display panel 20 (i.e., the Y-direction), and that their individual longer sides are aligned in the longitudinal direction of the liquid-crystal display panel 20 (i.e., the X-direction).

The pixels 27 are periodically arranged in the longitudinal direction of the liquid-crystal display panel 20 (i.e., the X-direction) and in the lateral direction of the liquid-crystal display panel 20 (i.e., the Y-direction). It is noted that the shape and size of the sub-pixels 28 is non-limiting; the shape of the sub-pixels 28 may be an arc in plan view. Further, the sub-pixels 28 of the different display colors may have different sizes; their sizes are designed as appropriate, on the basis of display performance required for the multi-display 200 and other things.

It is noted that each pixel, although consisting of the sub-pixels 28 of the three colors in FIG. 16, may consist of the sub-pixels 28 of four colors.

Figure 17:
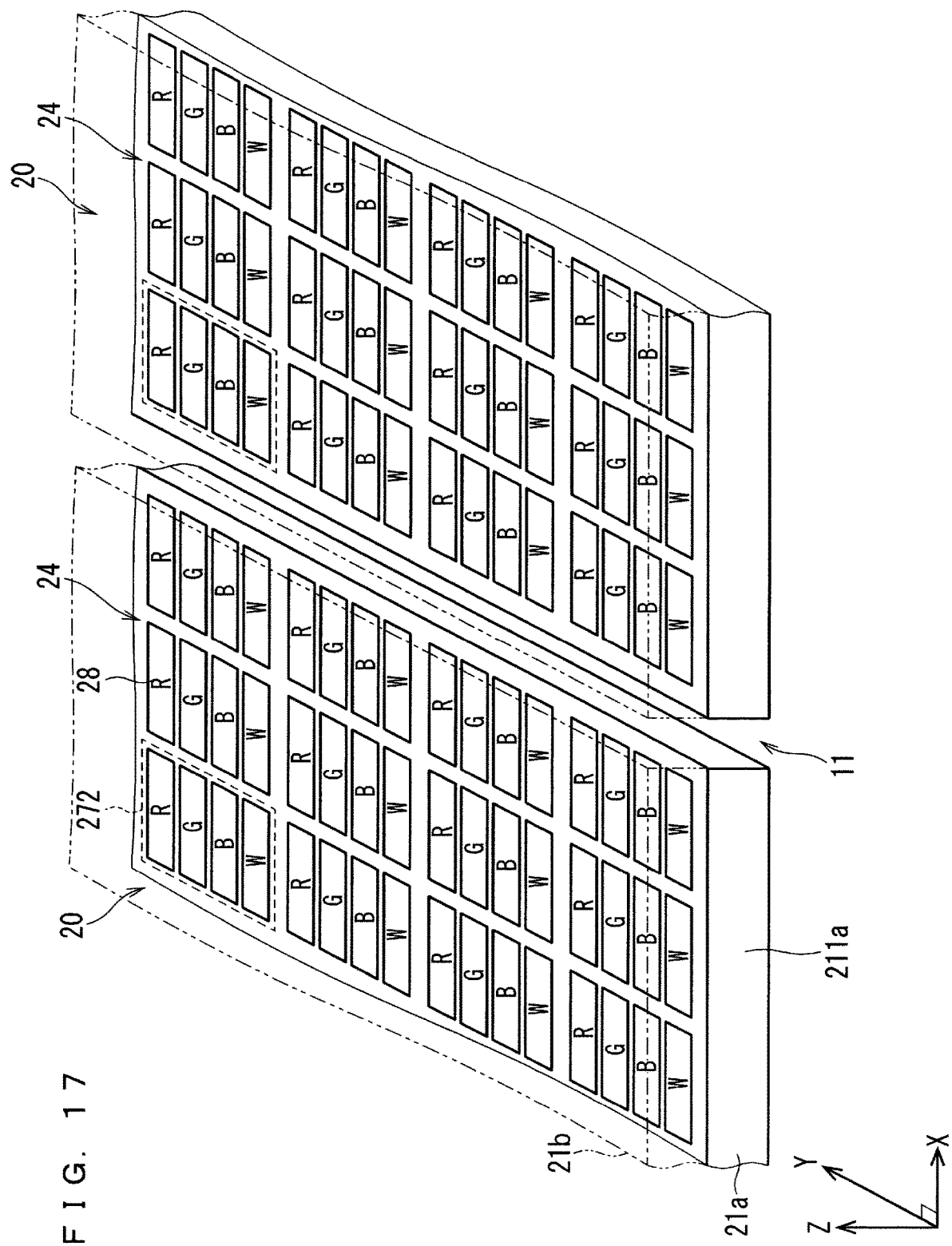
FIG. 17 is a perspective view near the joint between the liquid-crystal display panels included in the multi-display according to the second embodiment.

FIG. 17 is a perspective view of an example of sub-pixel arrangement in a configuration where each pixel consists of sub-pixels of four display colors: the sub-pixel 28 having a display color of white (W), the sub-pixel 28 having a display color of red (R), the sub-pixel 28 having a display color of green (G), and the sub-pixel 28 having a display color of blue (B). In FIG. 17, the sub-pixels 28 are arranged in the order of white (W), blue (B), green (G), and red (R) when viewed from the end 211a of the liquid-crystal display panel 20.

In this way, the sub-pixels 28, each of which is a rectangle in plan view, are arranged in such a manner the sub-pixels 28 of two or more different display colors are disposed between the sub-pixels 28 of the same display color, in a direction parallel to the joint 11 (i.e., the Y-direction).

<Effect>

As described above, the liquid-crystal display panels 20 of the multi-display 200 according to the second embodiment each have the following pixel arrangement. That is, the sub-pixels 28 are arranged in such a manner that the sub-pixels 28 of the two or more different display colors are disposed between the sub-pixels 28 of the same display color, in the direction parallel to the joint 11 (i.e., the Y-direction). This arrangement achieves favorable display quality without any monochrome bright lines found.

The sub-pixels 28 are arranged in such a manner that the sub-pixels 28 of the two or more different display colors are disposed between the sub-pixels 28 of the same display color, in the direction parallel to the joint 11. That is, the sub-pixels 28 are arranged in such a manner that the sub-pixels 28 of the two or more different display colors are disposed between the sub-pixels 28 of the same display color, in a direction where the boundary 33 including the curve 35 of the front-surface protective plate 30 extends. This arrangement prevents monochrome bright lines found at the boundaries 33 in mixed-color display (e.g., in white display and yellow display). As earlier described, a monochrome bright line is found at the boundary 33 when the light from the liquid-crystal display panel is separated into the individual colors of the sub-pixels. This problem is solved by the above arrangement, that is, the sub-pixels 28 in parallel to the boundary 33 of the front-surface protective plate 30 are arranged in such a manner that the sub-pixels 28 of the same display color sandwich the sub-pixels 28 of the two or more different display colors. This arrangement renders the light from the sub-pixels of the individual colors less separated, thereby reducing monochrome bright lines, which result from a particular color continuously found at the boundaries 33 in mixed-color display.

In this way, the multi-display 200 according to the second embodiment reduces, in mixed-color display, monochrome bright lines found at the boundaries of the optical refractive devices in the front-surface protective plate 30, thus providing display of high quality without display panel joints viewed from a user.

Although the foregoing embodiments have described an example where the liquid-crystal display panels are used as display panels, a multi-display that includes a display panel used in an organic electroluminescence display, a plasma display, or other types of display apparatus, and includes an array of such display panels, achieves the aforementioned effect.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is thus understood that numerous modifications and variations can be devised without departing from the scope of the invention.

The invention claimed is:

1. A multi-display comprising:
   a display panel array in which a plurality of display panels are arranged; and
   a protective plate disposed over a surface of the display panel array from which light is emitted, so as to cover the display panel array,
   wherein the protective plate has an optical refractive device in a position corresponding to a joint between a first display panel and a second display panel arranged adjacent to each other in the plurality of display panels arranged in the display panel array, the optical refractive device being configured to refract the light from the first display panel and the second display panel,
   the optical refractive device is provided, along the joint, in a front surface of the protective plate to have a groove shape,
   each of the first display panel and the second display panel has, in a display surface thereof, pixels each composed of a plurality of sub-pixels,
   sub-pixels of each of the first display panel and the second display panel are arranged so that, between two sub-pixels of the same display color, two or more sub-pixels of different display colors from each other are disposed at least in a direction parallel to a direction of extension of the joint along the joint, and
   the first display panel and the second display panel arranged adjacent to each other via the joint have different color arrangements of sub-pixels in each pixel at panel ends facing each other via the joint.

2. The multi-display according to claim 1, wherein the plurality of sub-pixels are arranged in such a manner that the plurality of sub-pixels of the two or more different display colors are disposed between the plurality of sub-pixels of the same display color, in at least a direction orthogonal to the direction where the joint extends.

3. The multi-display according to claim 1, wherein
   the plurality of sub-pixels are arranged in two columns and two rows within each of the pixels, and
   each of the plurality of sub-pixels is a square in a plan view, and comprises sides each disposed in parallel to a corresponding side of each of the plurality of display panels.

4. The multi-display according to claim 1, wherein the pixels adjacent to each other in the direction parallel to the direction where the joint extends, comprise mutually different display-color arrangements of the plurality of sub-pixels.

5. The multi-display according to claim 4, wherein the pixels adjacent to each other in a direction orthogonal to the direction where the joint extends, comprise mutually different display-color arrangements of the plurality of sub-pixels.

6. The multi-display according to claim 1, wherein the plurality of sub-pixels comprise three different display colors or four different display colors.

\* \* \* \* \*